(12) United States Patent
Murakami et al.

(10) Patent No.: US 9,435,647 B2
(45) Date of Patent: Sep. 6, 2016

(54) ANGULAR VELOCITY SENSOR

(75) Inventors: Hideyuki Murakami, Fukui (JP); Takashi Kawai, Fukui (JP); Masaki Nakamura, Fukui (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 1121 days.

(21) Appl. No.: 13/498,210

(22) PCT Filed: Oct. 7, 2010

(86) PCT No.: PCT/JP2010/006002
§ 371 (c)(1),
(2), (4) Date: Mar. 26, 2012

(87) PCT Pub. No.: WO2011/045909
PCT Pub. Date: Apr. 21, 2011

(65) Prior Publication Data
US 2012/0191398 A1    Jul. 26, 2012

(30) Foreign Application Priority Data

Oct. 13, 2009  (JP) .................. 2009-236384
Jan. 27, 2010  (JP) .................. 2010-014960
Jan. 27, 2010  (JP) .................. 2010-014961

(51) Int. Cl.
*G01C 19/00*  (2013.01)
*G01C 19/5776*  (2012.01)

(52) U.S. Cl.
CPC ................. *G01C 19/5776* (2013.01)

(58) Field of Classification Search
CPC ................................. G01C 19/5776
USPC ....................................... 73/504.12
See application file for complete search history.

(56) References Cited

U.S. PATENT DOCUMENTS 5,434,800 A * 7/1995 Davis ................. F02P 7/0675
324/172
6,553,835 B1   4/2003 Hobbs
(Continued)

FOREIGN PATENT DOCUMENTS

EP    2192690 A1   6/2010
JP    0989575 A    4/1997
(Continued)

OTHER PUBLICATIONS

International Application Serial No. PCT/JP2010/006002, International Search Report mailed Jan. 11, 2011, 7 pgs.
(Continued)

*Primary Examiner* — Hezron E Williams
*Assistant Examiner* — Tarun Sinha
(74) *Attorney, Agent, or Firm* — RatnerPrestia

(57) ABSTRACT

An angular velocity sensor including a vibration body having a sensor electrode, a driving electrode, and a monitor electrode. The monitor electrode generates a signal according to vibration of the vibration body. The sensor circuit outputs a signal representing an angular velocity applied to the vibration body. The amplitude determination circuit measures amplitude of vibration of the vibration body. A PLL circuit includes a constant voltage source for generating a constant voltage, a timing switching unit for outputting a voltage by switching selectively between the constant voltage and a voltage corresponding to the monitor signal, and a voltage-controlled oscillator for outputting an oscillation signal having a frequency corresponding to the voltage output from the timing switching unit. When the amplitude measured is smaller than a predetermined value, the timing switching unit outputs the constant voltage output from the constant voltage source and outputs a start-up mode signal.

3 Claims, 24 Drawing Sheets

(56) References Cited

U.S. PATENT DOCUMENTS

| | | | |
|---|---|---|---|
| 2002/0170356 A1* | 11/2002 | Yamashita | 73/514.34 |
| 2003/0206050 A1* | 11/2003 | Huard | G05F 1/46 |
| | | | 327/540 |
| 2005/0178202 A1 | 8/2005 | Uehara | |
| 2007/0151373 A1 | 7/2007 | Uemura | |
| 2008/0119325 A1* | 5/2008 | Kolb et al. | 477/111 |
| 2010/0013688 A1 | 1/2010 | Murakami et al. | |
| 2010/0188031 A1* | 7/2010 | Shimizu | H02P 1/52 |
| | | | 318/400.11 |
| 2010/0206069 A1 | 8/2010 | Murakami | |
| 2010/0237909 A1 | 9/2010 | Inukai | |

FOREIGN PATENT DOCUMENTS

| | | | |
|---|---|---|---|
| JP | 2000028364 A | | 1/2000 |
| JP | 2002188925 A | | 7/2002 |
| JP | 2005227234 A | | 8/2005 |
| JP | 2006119008 A | | 5/2006 |
| JP | 2006194701 A | | 7/2006 |
| JP | 2007255890 A | | 10/2007 |
| JP | 2009-192458 A | | 8/2009 |
| JP | 2009192458 A | * | 8/2009 |
| JP | 2009192458 A | | 8/2009 |
| WO | WO-2005080919 A1 | | 9/2005 |
| WO | WO-2009128188 A1 | | 10/2009 |

OTHER PUBLICATIONS

Supplementary European Search Report for Application No. EP 10 82 3177, dated Jun. 12, 2014.

* cited by examiner

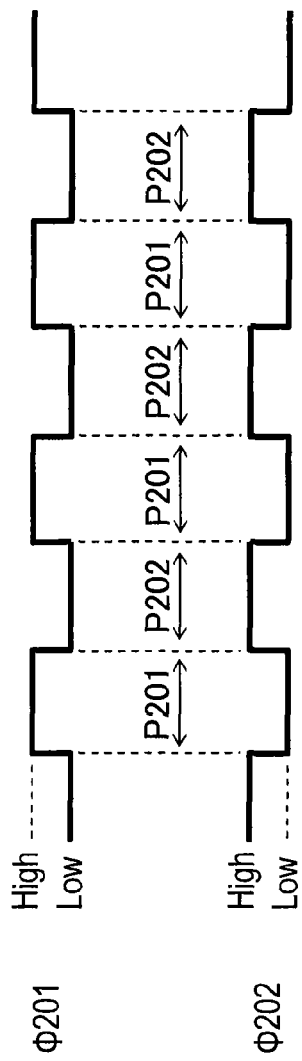
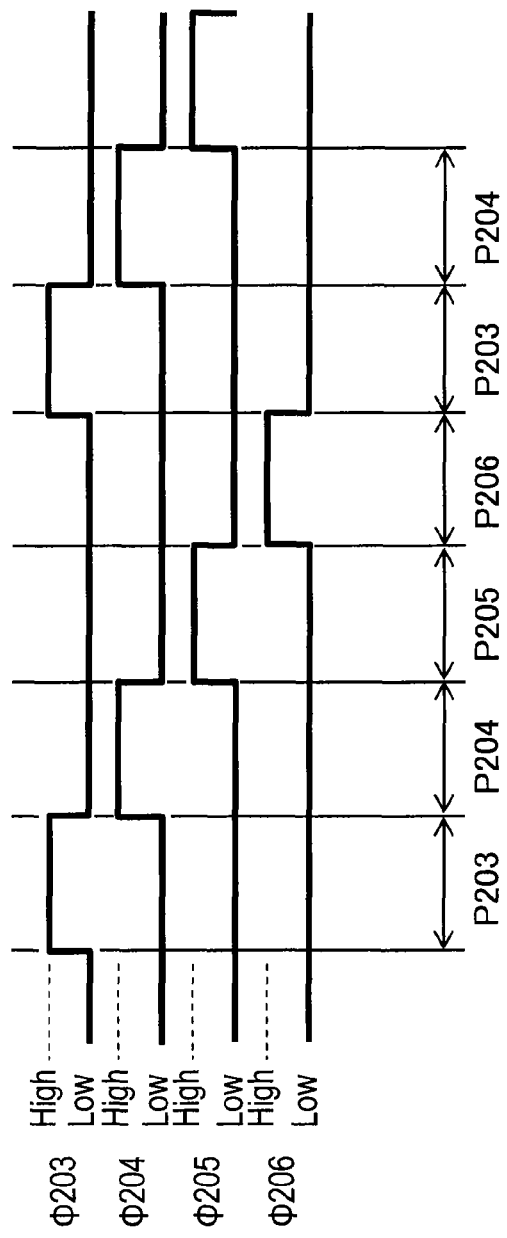

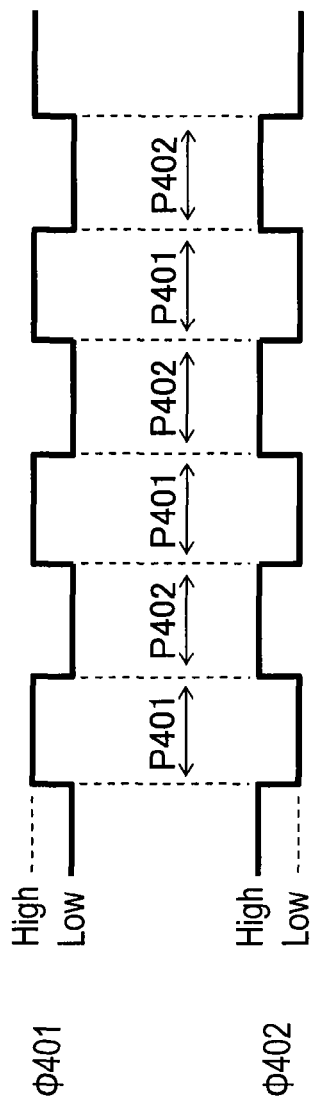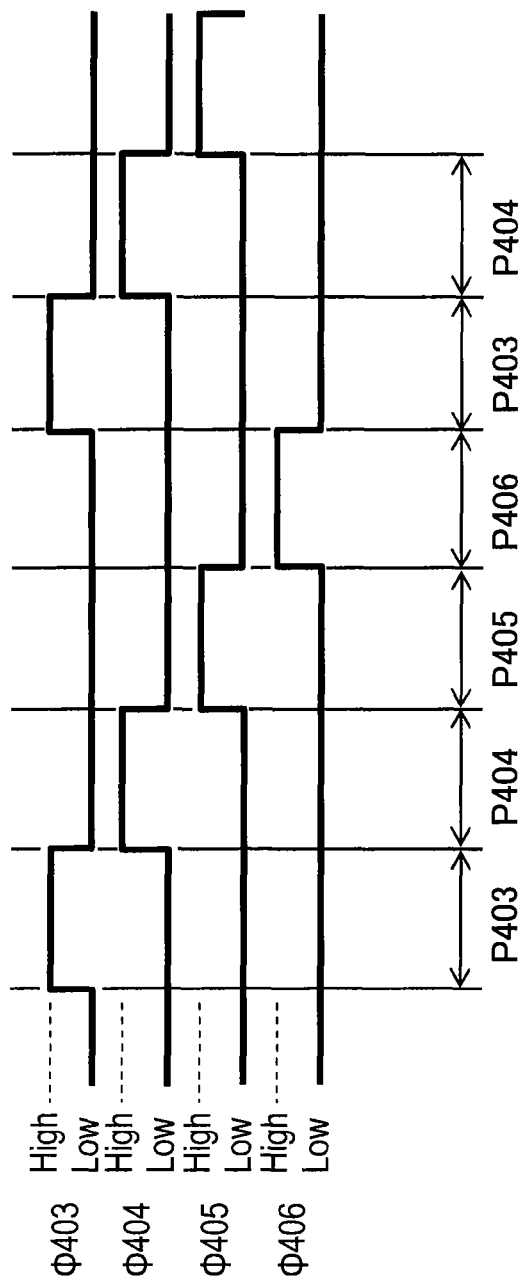

ANGULAR VELOCITY SENSOR

TECHNICAL FIELD

The present invention relates to an angular velocity sensor used for, e.g., attitude control and a navigation system of a movable body, such as an aircraft and motor vehicle.

BACKGROUND ART

FIG. 23 is a circuit diagram of conventional angular velocity sensor 5003 described in Patent Literature 1.

Sensor element 201 having an H-shape includes driving electrode 202, monitor electrode 203 and sensor electrode 204. A signal is input to driving electrode 202 to vibrate sensor element 201. Monitor electrode 203 outputs an electric charge responsive to amplitude of the vibration. When an angular velocity is applied to sensor element 201, sensor electrode 204 outputs an electric charge corresponding to a Coriolis force. A monitor signal output from monitor electrode 203 is input to drive circuit 205. Drive circuit 205 outputs to driving electrode 202 a driving signal adjusted according to the input monitor signal as to vibrate sensor element 201 with constant amplitude. A clock signal output from drive circuit 205 is supplied to timing control circuit 206 and sensor circuit 207. Timing control circuit 206 includes a PLL circuit. A sensor signal output from sensor electrode 204 is input to sensor circuit 207. Sensor circuit 207 detects the sensor signal output from sensor electrode 204 with a signal synchronized with a driving frequency of the sensor element output from drive circuit 205, and outputs an angular velocity signal corresponding to the angular velocity.

An operation of conventional angular velocity sensor 5003 will be described below.

When an alternating-current (AC) voltage is applied to driving electrode 202, sensor element 201 vibrates in a direction of an X-axis at the driving frequency. When an angular velocity is applied to sensor element 201 about a Z-axis, sensor element 201 vibrates in a direction of a Y-axis at a detecting frequency due to a Coriolis force. Sensor electrode 204 outputs a signal corresponding to an electric charge generated by this vibration, and a sensor circuit processes and outputs this signal to detect the angular velocity.

FIG. 24 is a block diagram of another conventional angular velocity sensor 5004 including digital drive circuit 208 implemented by digital circuits. Digital drive circuit 208 performs digital signal processing. Digital drive circuit 208 samples a monitor signal output from monitor electrode 203 with a clock signal of a fixed frequency output from oscillation circuit 209. In addition, digital drive circuit 208 performs digital signal processing to the sampled signal, and outputs to driving electrode 202 a driving signal adjusted to drive sensor element 201 to vibrate with constant amplitude. Digital drive circuit 208 outputs a multi-bit signal. This signal is input to timing control circuit 206 including a PLL circuit. Timing control circuit 206 outputs a detecting-phase timing signal. The detecting-phase timing signal is input to sensor circuit 207. Sensor circuit 207 performs synchronous detection with the detecting-phase timing signal, and outputs an angular velocity signal.

Digital drive circuit 208 produces jitter noise having periodicity as a phase error of the detecting-phase timing signal since digital drive circuit 208 operates based on the clock signal of fixed frequency output from oscillation circuit 209. This causes a periodical fluctuation of the output signal of sensor circuit 207, and tends to produce fluctuations of the signal output from sensor circuit 207.

The PLL circuit in timing control circuit 206 produces an output after reducing the jitter noise existing as a phase error by multiplying the multi-bit signal and integrating the jitter noise in time domain. In other words, the PLL circuit exhibits a characteristic of a low-pass filter as a frequency characteristic of an input to output phase response that indicates how a phase of the output signal responds to changes in phase of the input signal.

In conventional angular velocity sensor 5003, an undesired signal of the same phase as the monitor signal is removed from sensor electrode 204 even when there is an unbalance of the mass of sensor element 201 since it performs synchronous detection with the driving frequency of sensor element 201.

However, when the detecting-phase timing signal has jitter, a phase shift occurs according to the jitter in the detecting operation of sensor circuit 207. Due to the phase shift, the undesired signal that needs to be removed by the synchronous detection leaks to the output by as much as the product of the undesired signal and the phase shift. This results in occurrence of noise in the sensor output, hence preventing an accurate detection of the angular velocity.

FIG. 25 is a circuit diagram of still another conventional angular velocity sensor 5005 disclosed in Patent Literature 2.

Sensor element 401 made of a silicon material includes driving electrode 402, monitor electrode 403, and sensor electrode 404. A signal is input to driving electrode 402 to vibrate sensor element 401. Monitor electrode 403 outputs a monitor signal responsive to amplitude of the vibration of sensor element 401. Sensor electrode 404 outputs a sensor signal corresponding to a Coriolis force produced by an angular velocity applied to sensor element 401.

A monitor signal output from monitor electrode 403 is input to drive circuit 405. Drive circuit 405 outputs to driving electrode 402 a driving signal adjusted based on the input monitor signal to cause sensor element 401 to vibrate at constant amplitude. A sensor signal output from sensor electrode 404 is input to sensor circuit 407. Synchronous detection circuit 408 of sensor circuit 407 performs synchronous detection of the sensor signal output from sensor electrode 404 with using a signal synchronized with a driving frequency of sensor element 401, and outputs an angular velocity signal corresponding to the angular velocity. Memory 409 is implemented by a ROM. Temperature sensor 410 measures an ambient temperature. Output adjusting circuit 411 corrects an output signal detected synchronously by sensor circuit 407 based on data stored in memory 409.

An operation of conventional angular velocity sensor 5005 will be described below.

When an AC voltage is applied to driving electrode 402, sensor element 401 vibrates in a direction of an X-axis at the driving frequency. When an angular velocity is applied to vibrating sensor element 401 about a Z-axis, sensor element 401 vibrates in a direction of a Y-axis at a frequency of detection due to a Coriolis force. This vibration causes a change in capacitance of sensor electrode 404. Sensor circuit 407 executes C-V conversion of this change in the capacitance and outputs it as a voltage for detection of the angular velocity.

FIGS. 26A to 26D show relations between voltages in conventional angular velocity sensor 5004 and ambient temperatures around angular velocity sensor 5004. An operation output adjusting circuit 411 in response to a voltage output from sensor circuit 407 changing linearly with respect to the change in the temperature as shown in FIG. 26A will be explained below.

FIG. 26B shows the relation between the temperature and a voltage output from temperature sensor 410. FIG. 26C shows voltage output from memory 409 in response to the output from temperature sensor 410. Memory 409 stores correction data that indicates the relationship between the temperature and the voltage. Output adjusting circuit 411 corrects the signal output from sensor circuit 407 with using a voltage output from memory 409 according to the temperature. FIG. 26D shows the signal corrected by output adjusting circuit 411. The signal corrected by output adjusting circuit 411 does no change according to the temperature.

In conventional angular velocity sensor 5004, the intersection of the voltage shown in FIG. 26A and the voltage shown in FIG. 26C changes due to a change of the intercept on the X-axis of the voltage output from temperature sensor 410 shown in FIG. 26B, accordingly producing an offset in the corrected output signal shown in FIG. 26D.

CITATION LIST

Patent Literature

Patent Literature 1: Japanese Patent Laid-Open Publication No. 2002-188925
Patent Literature 2: Japanese Patent Laid-Open Publication No. 2007-255890

SUMMARY OF THE INVENTION

An angular velocity sensor includes a vibration body having a sensor electrode, a driving electrode, and a monitor electrode. The monitor electrode generates a signal according to vibration of the vibration body. The sensor circuit outputs a signal representing an angular velocity applied to the vibration body. The amplitude determination circuit measures amplitude of vibration of the vibration body. A PLL circuit includes a constant voltage source for generating a constant voltage, a timing switching unit for outputting a voltage by switching selectively between the constant voltage and a voltage corresponding to the monitor signal, and a voltage-controlled oscillator for outputting an oscillation signal having a frequency corresponding to the voltage output from the timing switching unit. When the amplitude measured by the amplitude determination circuit is smaller than a predetermined value, the timing switching unit outputs, to the voltage-controlled oscillator, the constant voltage output from the constant voltage source and outputs a start-up mode signal.

This angular velocity sensor has a stable output characteristic.

BRIEF DESCRIPTION OF DRAWINGS

FIG. 1B shows timing signals of the angular velocity sensor according to Embodiment 1.
FIG. 2 shows timing signals of the angular velocity sensor according to Embodiment 1.
FIG. 8B shows timing signals of the angular velocity sensor according to Embodiment 2.
FIG. 9 shows timing signals of the angular velocity sensor according to Embodiment 2.

DETAIL DESCRIPTION OF PREFERRED EMBODIMENTS

Exemplary Embodiment 1

Figure 1A:
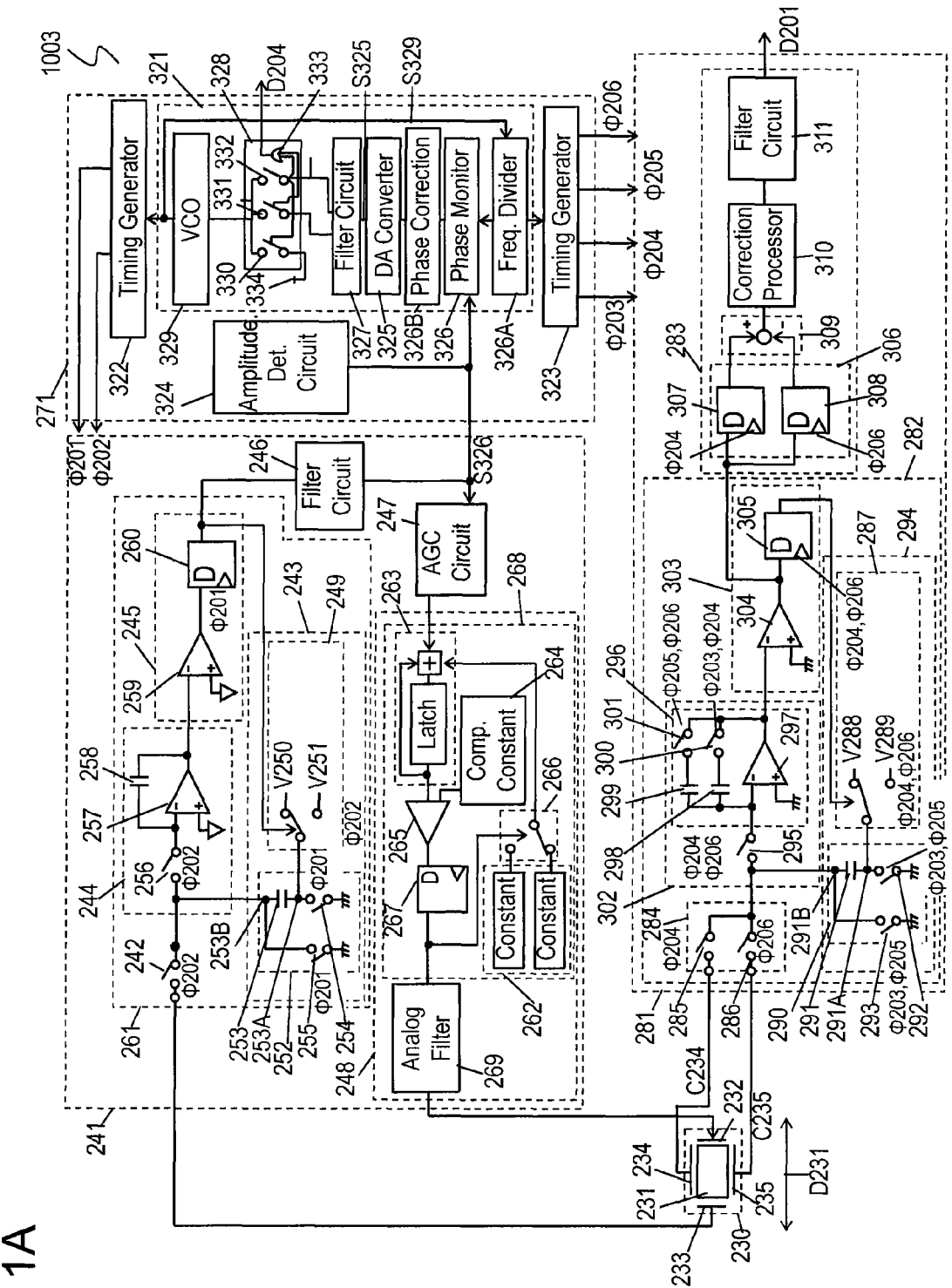
FIG. 1A is a circuit diagram of an angular velocity sensor according to Exemplary Embodiment 1 of the present invention.

FIG. 1A is a circuit diagram of angular velocity sensor 1003 according to Exemplary Embodiment 1 of the present invention.

Sensor element 230 includes vibration body 231, driving electrode 232, monitor electrode 233, and sensor electrodes 234 and 235. Driving electrode 232 includes a piezoelectric element for vibrating vibration body 231. Monitor electrode 233 includes a piezoelectric element for generating an electric charge responsive to the vibration of vibration body 231. Each of sensor electrodes 234 and 235 includes a piezoelectric element for generating an electric charge corresponding to an angular velocity applied to sensor element 230. The electric charges generated by sensor electrodes 234 and 235 have polarities opposite to each other.

FIG. 1B shows waveforms of timing signals φ201 and φ202 of angular velocity sensor 1003. Timing signals φ201 and φ202 have phases opposite to each other, and each of timing signals φ201 and φ202 has two values, a high level and a low level. Timing signal φ202 is at the high level and timing signal φ201 is at the low level during period P202. Timing signal φ202 is at the low level and timing signal φ201 is at the high level during period P201. Timing signals φ201 and φ202 alternately define periods P201 and P202 continuously.

Drive circuit 241 includes input switching unit 242, digital-to-analog (DA) conversion unit 243, integration unit 244, comparator unit 245, filter circuit 246 implemented by a digital filter, DA output unit 252, automatic gain control (AGC) circuit 247, and driver 248. Input switching unit 242 is connected with monitor electrode 233, and includes an analog switch activated by timing signal φ202. DA switching unit 249 switches and selectively outputs one of reference voltages V250 and V251 according to timing signal φ202. DA output unit 252 includes capacitor 253, switch (SW) 254 connected to one terminal 253A of capacitor 253, and SW 255 connected to another terminal 253B of capacitor 253. The reference voltage output from DA switching unit 249 is input to terminal 253A of capacitor 253. SW 254 and SW 255 are activated by timing signal φ201, and discharge an electric charge of capacitor 253. DA switching unit 249 and DA output unit 252 constitute DA conversion unit 243. DA conversion unit 243 discharges the electric charge stored in capacitor 253 during the period P201, and either inputs or outputs an electric charge corresponding to the reference voltage output from DA switching unit 249 during the period P202. SW 256 outputs signals output from input switching unit 242 and DA conversion unit 243 during the period P202, but does not output the signals during the period P201.

The signal output from SW 256 is input to integration unit 244. Integration unit 244 includes operational amplifier 257 and capacitor 258 connected between an output terminal and an inverting input terminal of operational amplifier 257. Integration unit 244 including capacitor 258 to integrate the signal output from SW 256, and outputs the integrated signal during the period P202. Comparator unit 245 includes comparator 259 and D-type flip-flop 260. Comparator 259 compares the integrated signal output from integration unit 244 with a predetermined value, and outputs a one-bit digital signal. D-type flip-flop 260 latches the one-bit digital signal output from comparator 259 at the beginning of period P201, and outputs the latched signal. The latched signal is input to DA switching unit 249 of DA conversion unit 243, and DA switching unit 249 switches the reference voltage V250 and the reference voltage V251. Input switching unit 242, DA conversion unit 243, integration unit 244, and comparator unit 245 constitute analog-to-digital (AD) converter 261 implemented by a Σ-Δ modulator that outputs a pulse-density modulated signal.

Filter circuit 246 extracts a signal of a resonant frequency component of vibration body 231 from the pulse-density modulated signal output from AD converter 261, and outputs a multi-bit signal having a noise component removed. This multi-bit signal is input to automatic gain control (AGC) circuit 247, and converted into an amplitude signal representing amplitude of the multi-bit signal by a half-wave rectifying and filtering circuit in AGC circuit 247. AGC circuit 247 reduces amplitude of the multi-bit signal output from filter circuit 246 when the amplitude of the multi-bit signal is large, and inputs the reduced multi-bit signal to driver 248. AGC circuit 247 increase the amplitude of the multi-bit signal when the amplitude of the multi-bit signal is small, and inputs the increased multi-bit signal to driver 248. AGC circuit 247 adjusts the multi-bit signal to cause vibration body 231 to vibrate with constant amplitude.

Driver 248 includes digital Σ-Δ modulator 268 including digital value output unit 262, summing integrator 263, value comparator 265, value switching unit 266 and flip-flop 267. Digital value output unit 262 holds two different levels of fixed digital values, and outputs one of the levels selectively. Summing integrator 263 adds and integrates the signal output from AGC circuit 247 and a signal output from digital value output unit 262. Value comparator 265 compares a signal output from summing integrator 263 with fixed reference value 264. Value switching unit 266 switches the digital value to be output from digital value output unit 262 according to an output of value comparator 265. Flip-flop 267 latches the signal output from value comparator 265 at predetermined timing. The multi-bit signal output from AGC circuit 247 is modulated into a one-bit pulse-density modulated signal, and output from digital Σ-Δ modulator 268. Analog filter 269 filters out a component of a frequency not necessary for driving sensor element 230 from this pulse-density modulated signal, and outputs it to sensor element 230.

Timing control circuit 271 generates timing signals φ201 to φ206 based on the multi-bit signal output from filter circuit 246 of drive circuit 241, outputs timing signals φ201 and φ202 to drive circuit 241, and outputs timing signals φ203, φ204, φ205 and φ206 to sensor circuit 281.

FIG. 2 shows waveforms of timing signals φ203, φ204, φ205 and φ206. Each of timing signals φ203, φ204, φ205 and φ206 has two values of a high level and a low level. Timing signal φ203 is at the high level, and other timing signals φ204, φ205, and φ206 are at the low level during period P203. Timing signal φ204 is at the high level, and other timing signals φ203, φ205, and φ206 are at the low level during period P204. Timing signal φ205 is at the high level, and other timing signals φ203, φ204 and φ206 are at the low level during period P205. Timing signal φ206 is at the high level, and other timing signals φ203, φ204 and φ205 are at the low level during period P206. Timing signals φ203, φ204, φ205 and φ206 continuously defines periods P203, P204, P205 and P206 in this order.

Sensor circuit 281 includes AD converter 282 implemented by a Σ-Δ modulator, and processing unit 283. Input switching unit 284 includes analog switches (SW) 285 and 286 connected to sensor electrodes 234 and 235 of sensor element 230, respectively. Analog switches (SW) 285 and 286 are activated by timing signals φ204 and φ206, respectively. Input switching unit 284 outputs a signal output from sensor electrode 234 during period P204, but does not outputs the signal during other periods P203, P205 and P206. In addition, input switching unit 284 outputs a signal output from sensor electrode 235 during period P206, but not output the signal during other periods P203, P204 and P205. DA switching unit 287 selectively switches and outputs one of reference voltages V288 and V289 in response to a predetermined signal. DA output unit 290 includes capacitor 291, SW 292 connected to one terminal 291A of capacitor 291, and SW 293 connected to the other terminal 291B of capacitor 291. SW 292 and SW 293 are activated by timing signals φ203 and φ205, and discharge an electric charge of capacitor 291 during periods P203 and P205, respectively. The signal output from DA switching unit 287 is input to terminal 291A of capacitor 291. DA switching unit 287 and DA output unit 290 constitute DA conversion unit 294. DA conversion unit 294 discharges the electric charge of capacitor 291 during the periods P203 and P205, and either inputs or outputs an electric charge corresponding to the reference voltage output from DA switching unit 287 during the periods P204 and P206.

SW 295 outputs a signal output from input switching unit 284 and a signal output from DA conversion unit 294 during the periods P204 and P206, but does not output the signals during the periods P203 and P205. The signal output from SW 295 is input to integration circuit 296. Integration circuit 296 includes operational amplifier 297, capacitors 298 and 299 connected between an output terminal and an inverting input terminal of operational amplifier 297, and SW 300 connected in series to capacitor 298, and SW 301 connected in series to capacitor 299. SW 300 operates according to timing signals φ203 and φ204 so that capacitor 298 integrates the signal input to integration circuit 296 during the periods P203 and P204, and holds the integrated signal. SW 301 operates according to timing signals φ205 and φ206 so that capacitor 299 integrates the signal input to integration circuit 296 during the periods P205 and P206, and holds the accumulated signal. SW 295 and integration circuit 296 constitute integration unit 302.

Comparator unit 303 includes comparator 304 and D-type flip-flop 305. Comparator 304 compares the integrated signal output from integration unit 302 with a predetermined value, and outputs a one-bit digital signal as a result of the comparison. D-type flip-flop 305 latches this one-bit digital signal at the beginning of periods P204 and P206, and outputs the latched signal. The latched signal is input to DA switching unit 287 of DA conversion unit 294. DA switching unit 287 switches the reference voltages V288 and V289. Input switching unit 284, DA conversion unit 294, integration unit 302, and comparator unit 303 constitute AD converter 282.

AD converter 282 thus converts the electric charges output from sensor electrodes 234 and 235 of sensor element 230 into the one-bit digital signals by performing a Σ-Δ modulation, and output the digital signals.

Latch circuit 306 includes D-type flip-flops 307 and 308 for latching the one-bit digital signal output from comparator 304 of comparator unit 303 of AD converter 282. D-type flip-flop 307 operates according to timing signal φ204 and latches the one-bit digital signal at the beginning of period P204, and outputs the latched signal. D-type flip-flop 308 operates according to timing signal φ206 and latches the one-bit digital signal at the beginning of period P206, and outputs the latched signal. Differential processing unit 309 performs a one-bit differential operation for calculating the difference between the latch signals output from D-type flip-flops 307 and 308 by a substitution operation. In other words, differential processing unit 309 outputs a one-bit differential signal of value "0" when both of the latched signals output from D-type flip-flops 307 and 308 have value of "0". Differential processing unit 309 outputs a one-bit differential signal of value "−1" when the latched signals output from D-type flip-flops 307 and 308 have values of "0" and "1", respectively. Differential processing unit 309 outputs a one-bit differential signal of value "1" when the latched signals output from D-type flip-flops 307 and 308 have values of "1" and "0", respectively. Differential processing unit 309 outputs a one-bit differential signal of value "0" when both the latched signals output from D-type flip-flops 307 and 308 have value of "1". Correction processor 310 corrects the one-bit differential signal output from differential processing unit 309 by a substitution operation based on a predetermined correction factor. That is, correction processor 310 substitutes the one-bit differential signal having a value of "0", "1" or "−1" with a multi-bit digital differential signal of value "0", "5" or "−5", respectively, when the predetermined correction factor is "5", for instance, and outputs the digital differential signal. Filter circuit 311 including a digital filter performs a filtering process of removing a noise component in the digital differential signal output from correction processor 310. Latch circuit 306, differential processing unit 309, correction processor 310 and filter circuit 311 constitute processing unit 283. Processing unit 283 latches the one-bit digital signals output from D-type flip-flops 307 and 308 at the beginnings of periods P204 and P206, performs the differential operation, the correction, and the filtering, and outputs multi-bit digital signals.

Timing control circuit 271 includes phase-locked loop (PLL) circuit 321, timing generation circuits 322 and 323, and amplitude determination circuit 324.

PLL circuit 321 reduces a phase noise by multiplying a frequency of the multi-bit signal output from filter circuit 246 of drive circuit 241 and by integrating the phase noise in time domain, and outputs the integrated signal to timing generation circuits 322 and 323. Phase monitor 326 receives a rectangular wave signal obtained by shaping the waveform of the multi-bit signal output from filter circuit 246 and a signal output from frequency divider 326A. Voltage-controlled oscillator (VCO) 329 generates oscillation signal S329 having frequency f329. Timing generation circuit 322 generates timing signals φ201 and φ202 based on oscillation signal S329, and outputs timing signals φ201 and φ202 to drive circuit 241. Frequency divider 326A divides the frequency of oscillation signal S329. A value that is output from drive circuit 241 or the AD converter in the timing of timing signal φ202 itself is a value corresponding to an amount of a phase difference between timing signal φ202 and a center value, i.e., the zero point of a sinusoidal wave signal. Upon having an analog signal of the sinusoidal wave input thereto, AD converter 261 samples the analog signal in the timing of timing signal φ201, converts the sampled signal into a digital signal corresponding to amplitude of the input analog signal, and supplies the digital signal to phase monitor 326. For instance, the center value of the sinusoidal wave signal is converted into value "0" of this digital signal. Phase monitor 326 outputs a digital value input at the timing of timing signal φ202. This digital value is input to phase correction circuit 326B, and phase correction circuit 326B corrects the digital value into a predetermined value supplies the corrected value to DA converter 325. DA converter 325 then outputs an analog value corresponding to the input digital value. This analog signal is input to voltage-controlled oscillator 329 through filter circuit 327 including a loop filter and timing switching unit 328. Voltage-controlled oscillator 329 outputs oscillation signal S329 of a frequency corresponding to the input analog signal, and oscillation signal S329 is fed back as a timing signal of AD converter 261. A value that is output from AD converter 261 in the timing of timing signal φ202 itself is a value corresponding to an amount of a phase difference between timing signal φ202 and a center value, i.e., the zero point of a sinusoidal wave signal. That is, the value output from AD converter 261 is the same value as that output from a phase comparator in ordinary PLL circuit 321.

Figure 3:
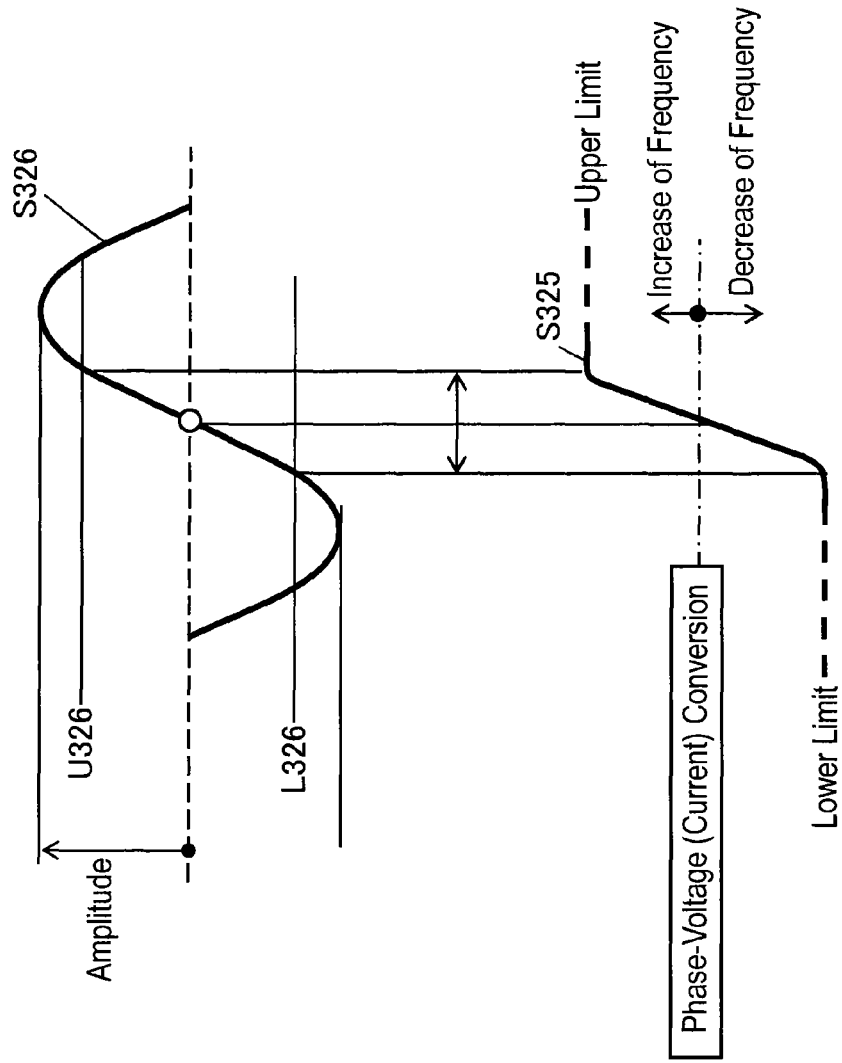
FIG. 3 shows signals of the angular velocity sensor according to Embodiment 1.

FIG. 3 shows analog signal S326 input to phase monitor 326 and analog signal S325 output from DA converter 325. As shown in FIG. 3, DA converter 325 outputs an analog signal that decreases the frequency output from voltage-controlled oscillator 329 when the digital value output from phase monitor 326 has a negative value. On the other hand, DA converter 325 outputs analog signal S325 that increases the frequency output from voltage-controlled oscillator 329 when the digital value output from phase monitor 326 has a positive value. As illustrated, PLL circuit 321 is loop-controlled to cause analog signal S325 output from DA converter 325 to be constant. That is, the digital value becomes "0" in the timing of timing signal φ202. This operation synchronizes the sampling timing of AD converter 261 with timing that crosses the center value of the input analog signal, and thus, synchronizes the timing accurately with the center value, i.e., the zero point of the analog signal.

Phase monitor 326 monitors the input digital value to determine whether the input digital value exceeds a predetermined upper limit U326, or it falls below a predetermined lower limit L326. The output value of phase monitor 326 changes at the timing of timing signal φ202.

Figure 4:
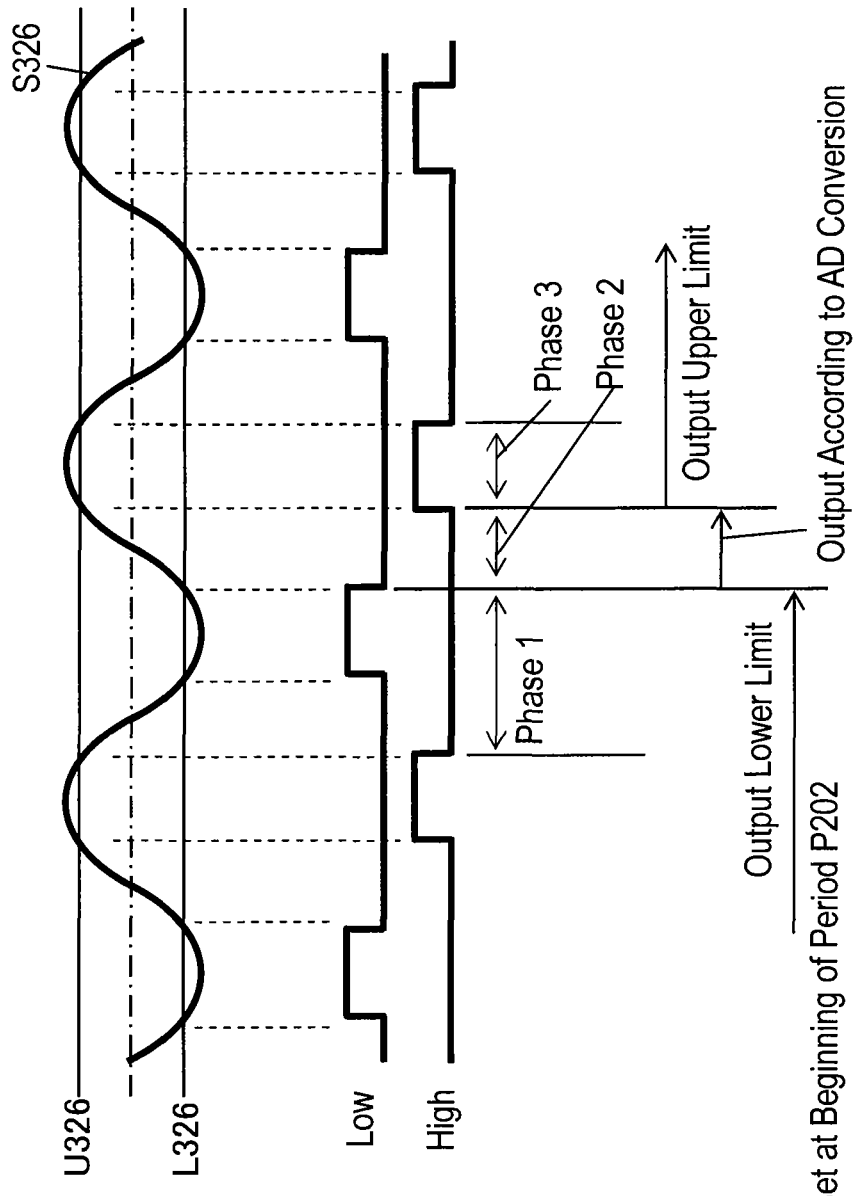
FIG. 4 shows signals of the angular velocity sensor according to Embodiment 1.

FIG. 4 illustrates an operation of PLL circuit 321. More specifically, as shown in FIG. 4, a time period defined as phase 1 starts when a digital value of analog signal S326 input after timing signal φ202 is supplied, i.e., after the start of period P202, falls below the upper limit U326 and then below the lower limit L326, and ends when the digital value rises above the lower limit L326. A time period defined as phase 2 starts from the end of phase 1 and ends when the input digital value exceeds the upper limit U326 first after the start of phase 2. A time period defined as phase 3 starts from the end of phase 2 and ends when analog signal S326 falls below the upper limit U326 first after the start of phase 3. Phase monitor 326 outputs the lower limit L326 when timing signal φ202 is input in phase 1. Phase monitor 326 outputs the input digital value at the timing of timing signal φ202 when timing signal φ202 is input in phase 2. Phase monitor 326 outputs the upper limit U326 when timing signal φ202 is input in phase 3. DA converter 325 then receives the digital value output from phase monitor 326, and outputs an analog signal of the amplitude corresponding to this digital value. This analog signal is input to filter circuit 327 including a loop filter to filter the analog signal, and the filtered analog signal is input to voltage-controlled oscillator 329 through timing switching unit 328. Voltage-controlled oscillator 329 outputs a frequency determined based on the signal obtained by filtering the analog signal corresponding to the digital value output from phase monitor 326. Since phase monitor 326 has the functions of determining the phase and setting the upper limit U326 and the lower limit L326 of the output signal as discussed above, the analog signal input to voltage-controlled oscillator 329 is maintained within a predetermined range. As a result, the frequency of the signal output from voltage-controlled oscillator 329 can be restricted. This prevents malfunctions, such as so-called double frequency lock in which PLL circuit 321 locks at a frequency other than the frequency determined by multiplying the frequency of the input analog signal by a frequency dividing factor of the frequency divider in the overall operation of PLL circuit 321, thereby ensuring PLL circuit 321 to lock at the predetermined frequency.

Phase correction circuit 326B to which the signal output from phase monitor 326 is input changes the input phase comparison value by a predetermined value and outputs the changed value, and hence, can adjust the phase to be locked precisely by a resolution of the digital value. If phase correction circuit 326B adds a positive value to the input value, for instance, voltage-controlled oscillator 329 outputs a frequency that is higher by a value corresponding to the added value than the case without the addition, hence locking the frequency at a point of the phase shifted forward.

If the signals delay due to AD conversion or arithmetic operations in AD converter 261 by a certain number of clocks, the phase is locked while shifting by the amount of the delay. However, the value output from phase monitor 326 is changed to a value corresponding to the timing shifted only by the number of clocks delayed from the timing of timing signal φ202. This operation can synchronizes timing signal φ202 with the timing that crosses the center value of the input analog signal. Hence, timing signal φ202 is synchronized accurately with the center value, i.e., the zero point of the analog signal.

The signal output from phase monitor 326 is input to filter circuit 327 including a loop filter via phase correction circuit 326B. Filter circuit 327 converts the input signal into a direct current (DC) signal by reducing AC components in the input signal. The signal output from filter circuit 327 and a voltage of a constant value are input to timing switching unit 328. Timing switching unit 328 includes switches 330, 331, and 332 and OR circuit 333. Switch 330 is electrically connected with constant voltage source 334. An output signal of constant voltage source 334 is output selectively to one of voltage-controlled oscillator 329 and OR circuit 333 by switching the switch 330. Switch 331 is connected with filter circuit 327. An output signal of filter circuit 327 is output selectively to one of voltage-controlled oscillator 329 and OR circuit 333 by switching switch 331. Switch 332 is connected with filter circuit 327. The output signal of filter circuit 327 is output to voltage-controlled oscillator 329 by turning on switch 332. OR circuit 333 outputs a high level signal as a mode signal when at least one of switches 330 and 331 is turned on.

A multi-bit signal output from filter circuit 246 is input to amplitude determination circuit 324. Amplitude determination circuit 324 monitors amplitude of the multi-bit signal output from filter circuit 246. When the amplitude is equal to or larger than 50% of target amplitude, timing switching unit 328 selects the output signal of filter circuit 327 and outputs the selected signal to voltage-controlled oscillator 329. PLL circuit 321 forms a closed loop, and multiplies a monitor signal of the driving frequency of vibration body 231 as an input signal, and outputs a signal having the phase noise reduced by the integration in time domain. The signal synchronized with a specific driving frequency of sensor element 230 is thus input to timing generation circuits 322 and 323. On the other hand, timing switching unit 328 is switched to select the output signal from constant voltage source 334 and outputs the selected signal to voltage-controlled oscillator 329 when the amplitude of the multi-bit signal output from filter circuit 246 is smaller than 50% of the target amplitude. In other words, voltage-controlled oscillator 329 outputs a signal of the fixed frequency corresponding to the constant voltage value, and this signal is input to timing generation circuits 322 and 323. Phase monitor 326 compares the output signal of filter circuit 246 with the output signal of frequency divider 326A. Phase monitor 326 then supplies the output signal of filter circuit 327 to voltage-controlled oscillator 329 through output switch 331 when these output signals have a difference not smaller than 30 degrees between the signals. On the other hand, phase monitor 326 supplies the output signal of filter circuit 327 to voltage-controlled oscillator 329 through output switch 332 when the output signal of frequency divider 326A and the output signal of filter circuit 246 have a difference smaller than 30 degrees between the signals. At this moment, switches 330 and 331 are connected to OR circuit 333 to cause OR circuit 333 to output a signal of a high level.

As described above, the output voltage of timing switching unit 328 is input to voltage-controlled oscillator 329. Voltage-controlled oscillator 329 is a variable frequency oscillator for oscillating a signal having the frequency corresponding to a voltage input to the oscillator, and the oscillation signal output from this voltage-controlled oscillator 329 is input to frequency divider 326A and timing generation circuits 322 and 323.

Timing generation circuit 322 generates timing signals $\phi 201$ and $\phi 202$ based on the signal output from PLL circuit 321, and outputs the timing signals to drive circuit 241. Timing generation circuit 323 frequency divides the monitor signal to change two cyclic periods of the monitor signal into periods of P203, P204, P204 and P205. Timing generation circuit 323 also generates timing signals $\phi 203$, $\phi 204$, $\phi 205$ and $\phi 206$ that become at a high level during periods P203, P204, P204 and P205, respectively, and outputs the timing signals to sensor circuit 281.

An operation of angular velocity sensor 1003 according to Embodiment 1 will be described below.

When a driving signal is supplied to driving electrode 232 of sensor element 230, vibration body 231 resonates, and produces an electric charge in monitor electrode 233. The electric charge produced in monitor electrode 233 is input to AD converter 261 of drive circuit 241, and converted into a pulse-density modulated signal. This pulse-density modulated signal is input to filter circuit 246, and filter circuit 246 extracts a component of resonant frequency of vibration body 231 from the pulse-density modulated signal, and outputs a multi-bit signal having noise components removed.

An operation of AD converter 261 in this case will be described below. AD converter 261 operates according to timing signals $\phi 201$ and $\phi 202$ that define periods P201 and P202 that are repeated alternately in synchronization with the monitor signal output from timing control circuit 271, respectively. The signal output from monitor electrode 233 is $\Sigma$-$\Delta$ modulated and converted into a one-bit digital signal in the period P201.

An operation of angular velocity sensor 1003 in the periods P201 and P202 will be detailed below.

Figure 5:
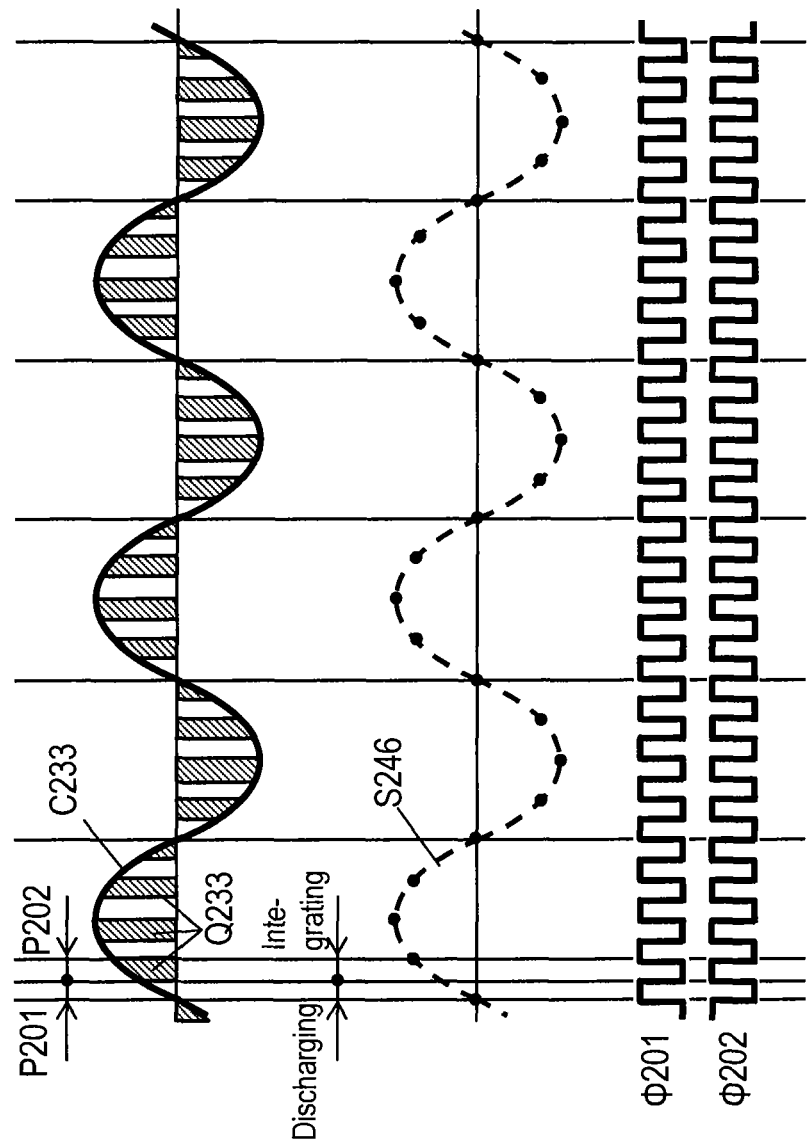
FIG. 5 shows signals of the angular velocity sensor according to Embodiment 1.

FIG. 5 shows timing signals $\phi 201$ and $\phi 202$ and signal C233 that appears in monitor electrode 233. During period P201, an integrated value stored in capacitor 258 of integration unit 244 is input to comparator 259 of comparator unit 245, and comparator 259 outputs a one-bit digital signal. The one-bit digital signal output from comparator 259 is latched by D-type flip-flop 260 at the beginning of period P201, and this latched signal is input to DA switching unit 249 of DA conversion unit 243. An electric charge held in capacitor 253 is discharged when SW 254 and SW 255 of DA output unit 252 are turned on.

Then, in the period P202, DA switching unit 249 switches one of reference voltages V250 and V251 and selectively output reference voltages V250 and V251 to capacitor 253 according to the signal input thereto. DA conversion unit 243 outputs an electric charge corresponding to the input reference voltage. In addition, input switching unit 242 is turned on to input the electric charge produced in monitor electrode 233 of sensor element 230. Furthermore, SW 256 of integration unit 244 is turned on to cause the electric charges output from input switching unit 242 and DA conversion unit 243 to be input to integration unit 244. As a result, the total sum in amount of electric charge Q233 shown in FIG. 5 and the electric charge output from DA conversion unit 243 is integrated and stored in capacitor 258 of integration unit 244 during the period P202.

The operation discussed above in the periods P201 and P202 causes an electric charge of the amount corresponding to the amplitude output from monitor electrode 233 of sensor element 230 is $\Sigma$-$\Delta$ modulated, and output as a one-bit digital signal at the beginning of period P201, as shown in FIG. 5.

Thus, the electric charge of the amount corresponding to the amplitude output from monitor electrode 233 of sensor element 230 is $\Sigma$-$\Delta$ modulated by AD converter 261 and output as the one-bit digital signal in the above-mentioned timing.

Multi-bit signal S246 shown in FIG. 5 output from filter circuit 246 in drive circuit 241 is input to a full-wave rectification and filter circuit in AGC circuit 247, and is converted into an amplitude signal that represents the amplitude of multi-bit signal S246. When the multi-bit signal is data of 10 bits, the multi-bit signal has a value of "512" at both the positive side and the negative side, and the amplitude signal can be obtained easily by taking only the average of the absolute value of the multi-bit signal. When the amplitude signal is 50% or smaller than the predetermined target amplitude, angular velocity sensor 1003 is determined as to be in a start-up mode immediately after the start up, and the output signal of constant voltage source 334 is input to voltage-controlled oscillator 329 through switch 330. At this moment, switch 330 is connected with the input terminal of OR circuit 333, and a start-up mode signal of high level is output from OR circuit 333, indicating that angular velocity sensor 1003 is in the start-up mode. The start-up mode signal signifies that angular velocity sensor 1003 is just after started, and it is unable to detect an angular velocity normally under the state of start-up.

Figure 6:
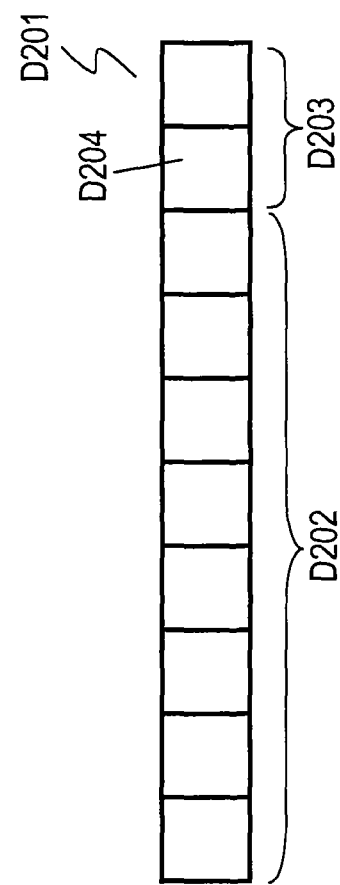
FIG. 6 shows signals output from the angular velocity sensor according to Embodiment 1.

FIG. 6 shows signal D201 output from angular velocity sensor 1003. Start-up mode signal D204 output from OR circuit 333 is a redundancy added to signal D202 output from filter circuit 311 in processing unit 283 of sensor circuit 281. That is, signal D201 consists of signal D202 and redundant signal D203 added to signal D202, as shown in FIG. 6. Start-up mode signal D204 corresponds to one bit of redundant signal D203. This arrangement allows a host system receiving output signal D201 from angular velocity sensor 1003 to recognize that angular velocity sensor 1003 is still in the start-up mode as it is unable to detect an accurate angular velocity while using the constant voltage source under the starting up condition.

On the other hand, angular velocity sensor 1003 is in a phase adjustment mode or in a normal operation mode when the amplitude signal is 50% or larger than the target amplitude. Phase monitor 326 compares the output signal from filter circuit 246 with the output signal from frequency divider 326A. Phase monitor 326 determines that angular velocity sensor 1003 is in the phase adjustment mode when a difference in the phases of the two signals is 30 degrees or larger, and adjusts the phases, that is, the output signal from filter circuit 327 is output to voltage-controlled oscillator 329 through switch 331. At this moment, switch 331 is connected with the input terminal of OR circuit 333, and a phase adjustment mode signal of high level is output from OR circuit 333, indicating that angular velocity sensor 1003 is in the phase adjustment mode.

As described, phase monitor 326 outputs a phase adjustment mode signal through timing switching unit 328 when an amount of a phase difference is outside of a predetermined threshold range. The phase adjustment mode signal is thus output while the angular velocity is not accurately detectable due to the phase difference. Signal D201 output from angular velocity sensor 1003 is input to the host system. The host system recognizes that angular velocity sensor 1003 is in the phase adjustment mode and unable to detect an accurate angular velocity while the constant voltage source is used under the starting up condition. This improves accuracy of the output signal of angular velocity sensor 1003.

The angular velocity sensor is in the normal operation mode when the phase difference between the output signal from filter circuit 246 and the output signal from frequency divider 326A is 30 degrees or less, and the output signal of filter circuit 327 is input to voltage-controlled oscillator 329 through switch 332. At this moment, both switches 330 and 331 are turned off and not connected with the input terminal of OR circuit 333, and OR circuit 333 outputs a normal operation mode signal of low level which indicates that the angular velocity sensor is in the normal operation mode. When the amplitude is large, AGC circuit 247 attenuates the multi-bit signal output from filter circuit 246 and inputs the attenuated signal to driver 248. On the other hand, when the amplitude is small, AGC circuit 247 amplifies the multi-bit signal output from filter circuit 246 and inputs the amplified signal to driver 248. AGC circuit 247 thus adjusts the multi-bit signal to cause vibration body 231 vibrate at a constant amplitude.

As described, phase monitor 326 outputs the normal operation mode signal from timing switching unit 328 when the amount of phase difference is within the predetermined threshold range. In other words, the normal operation mode signal is output only when the angular velocity can be detected accurately. As a result, the host system that receives signal D201 output from angular velocity sensor 1003 can recognize that angular velocity sensor 1003 is capable of detecting angular velocities accurately, thereby improving accuracy of the output signal from angular velocity sensor 1003.

Digital value output unit 262 holds two predetermined constant values. Value switching unit 266 outputs one of these two constant values. The multi-bit signal output from AGC circuit 247 and the constant value output from value switching unit 266 are input to summing integrator 263 of digital $\Sigma$-$\Delta$ modulator 268 to be added and integrated. Value comparator 265 compares an integrated value output from summing integrator 263 with fixed reference value 264, and outputs a comparison result. Flip-flop 267 latches the comparison result at a predetermined timing, and outputs the latched result. The output of flip-flop 267 causes value switching unit 266 to switch and output one of the constant values. In this case, value switching unit 266 outputs a larger one of two values output from digital value output unit 262 when the value output from summing integrator 263 is smaller than comparison constant value 264. If the value output from summing integrator 263 is larger than comparison constant value 264, value switching unit 266 outputs a smaller one of the two values output from digital value output unit 262. By repeating this operation, the multi-bit signal output from AGC circuit 247 is modulated into a one-bit pulse-density modulated signal, and the one-bit pulse-density modulated signal is output from flip-flop 267. In the case that the signal input to digital $\Sigma$-$\Delta$ modulator 268 has 10 bits (=±9 bits), for example, comparison constant value 264 is set preferably to value "0", and the two values output from digital value output unit 262 are set to "511" and "−511" or larger values.

Since $\Sigma$-$\Delta$ modulator 268 executes over-sampling to perform noise shaping of quantized noise to a high-frequency range, the signal output from AD converter 261 contains high frequency noise components. However, since sensor element 230 cannot respond to such a high frequency, vibration body 231 of sensor element 230 vibrates at an over-sampled predetermined frequency component rather than a sampling frequency of the pulse-density modulated signal. If sensor element 230 has a high response gain in the high frequency, noise of such high frequency may become a problem. Analog filter 269 has a function of reducing the frequency component that leads to the problem, thereby providing drive circuit 241 with low noise and high accuracy.

While sensor element 230 having a mass m vibrates flexibly at velocity V in a driving direction D231 shown in FIG. 1A and rotates at angular velocity ω about the center axis in the longitudinal direction of vibration body 231, sensor element 230 receives Coriolis force F as follows.

$$F = 2 \times m \times V \times \omega$$

Figure 7:
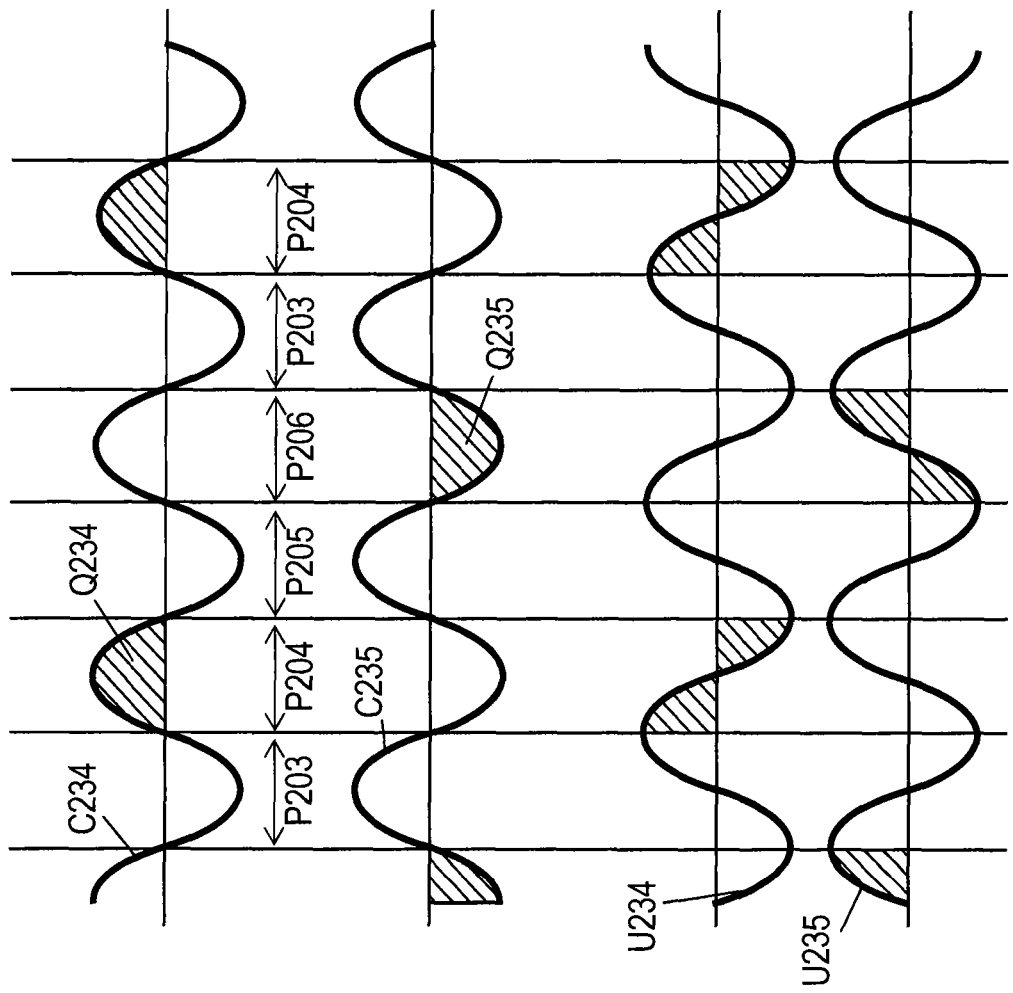
FIG. 7 shows signals of the angular velocity sensor according to Embodiment 1.

FIG. 7 shows sensor signal C234 and undesired signal U234 output from sensor electrode 234 of sensor element 230, and sensor signal C235 and undesired signal U235 output from sensor electrode 235. The Coriolis force F induces electric charges in sensor electrodes 234 and 235 to generate sensor signals C234 and C235. Sensor signals C234 and C235 are generated by Coriolis force F, and hence, have sinusoidal waveforms with phases advancing by 90 degrees from the signal generated in monitor electrode 233. As shown in FIG. 7, sensor signals C234 and C235 are sinusoidal waves having phases inverse to each other, thus being a positive signal and a negative signal, respectively.

An operation of AD converter 282 in the above case will be described below. Timing signals φ203, φ204, φ205 and φ206 define periods P203, P204, P205 and P206 that repeat continuously in this order. AD converter 282 $\Sigma$-$\Delta$ modules sensor signal C234 output from sensor electrode 234 and converts sensor signal C234 into a one-bit digital signal during the periods P203 and P204. AD converter 282 also $\Sigma$-$\Delta$ modulates the negative signal output from sensor electrode 235 and converts the negative signal into a one-bit digital signal during the periods P205 and P206.

An operation of AD converter 282 during the periods P203, P204, P205 and P206 will be detailed below.

During the period P203, SW 300 connected with capacitor 298 of integration unit 302 is turned on, and an integrated value held in capacitor 298 is input to comparator 304 of comparator unit 303, which outputs a comparison result as a one-bit digital signal. In addition, SW 292 and SW 293 of DA conversion unit 294 are turned on to discharge an electric charge held in capacitor 291.

Then, during the period P204, a one-bit digital signal output from comparator 304 of comparator unit 303 is latched by D-type flip-flop 305 at the beginning of the period P204, and the latched signal is input to DA switching unit 287 of DA conversion unit 294. DA switching unit 287 switches and selects one of reference voltages V288 and V289 according to the signal input thereto, and inputs the selected reference voltage to capacitor 291. Hence an electric charge corresponding to the input reference voltage is output. SW 285 of input switching unit 284 is turned on to output the electric charge generated from sensor electrode 234. SW 295 of integration unit 302 is turned on to input the electric charges output from input switching unit 284 and DA conversion unit 294 to integration circuit 296. As a result, a total sum of an amount of electric charge Q234 shown in FIG. 7 and the electric charge output from DA conversion unit 294 is integrated and stored in capacitor 298 of integration circuit 296 during the period P204.

As described above, AD converter 282 Σ-Δ modulates an amount of electric charge equivalent to one-half of the amplitude value output from sensor electrode 234 out of two sensor electrodes 234 and 235 during the periods P203 and P204.

Similarly, during the periods P205 and P206 following the period P204 AD converter 282 Σ-Δ modulates on an amount of electric charge equivalent to one-half of the amplitude value output from sensor electrode 235.

The above operation causes the electric charge of the amount equivalent to a half of the amplitude value of the electric charges output from both sensor electrodes 234 and 235 is Σ-Δ modulated by single AD converter 282. Moreover, the Σ-Δ modulated electric charge is output as a pair of one-bit digital signals output from D-type flip-flops 307 and 308, respectively.

The electric charges output from sensor electrodes 234 and 235 of sensor element 230 contain not only the sensor signals generated by the Coriolis force attributed to the angular velocity but also undesired signals having phases identical to the phase of the monitor signal. AN operation of angular velocity sensor 1003 in this case will be described below. Integration circuit 296 integrates an amount of the electric charge equivalent to a half of the amplitude value of sensor signals C234 and C235 generated by the Coriolis force F attributed to the angular velocity during the period P204 and P206. Undesired signals U234 and U235 generated in respective sensor electrodes 234 and 235 have phases that are identical to the phase of the monitor signal but shift by 90 degrees with respect to sensor signals C234 and C235. When integration circuit 296 integrates undesired signals U234 and U235 during the periods P204 and P206 as well as sensor signals C234 and C235, the resulting value becomes "0" since the integration is made of an amount of electric charge in the duration from maximum values to minimum values of undesired signals U234 and U235 with reference to their center values. In other words, during the periods P204 and P206, integration unit 302 integrates the amount of electric charge corresponding to the amplitudes of sensor signals C234 and C235 while undesired signals U234 and U235 are cancelled. That is, the so-called synchronous detection process is executed on each of sensor signals C234 and C235. Accordingly, AD converter 282 Σ-Δ modulates the synchronous detected signal, converts the modulated signal into a one-bit digital signal, and outputs the one-bit digital signal.

An operation of processing unit 283 will be described below. First, the one-bit digital signal output from comparator 304 of AD converter 282 is latched by D-type flip-flop 307 of latch circuit 306 at the beginning of the period P204. The one-bit digital signal output from comparator 304 is also latched by D-type flip-flop 308 of latch circuit 306 at the beginning of the period P206.

The amounts of electric charges equivalent to respective one-halves of the amplitude values of the signals output from the pair of sensor electrodes 234 and 235 of sensor element 230 are converted into digital values by the Σ-Δ modulation, respectively. At this moment, the signals output from sensor electrodes 234 and 235 have the undesired signals removed. The pair of one-bit digital signals latched by the pair of D-type flip-flops 307 and 308 are these digital values. Next, the pair of one-bit digital signals output from latch circuit 306 is input to one-bit differential processing unit 309 to calculate a difference of this pair of one-bit digital signals and output the difference as a one-bit differential signal. The one-bit differential signal in the period P203 is the difference of the one-bit digital signals latched during the difference in the preceding periods P204 and P206. This one-bit differential signal represents an amplitude value after undesired signal U234 and U235 shown in FIG. 7 are removed. In the above operation, the pair of input signals that are in the relationship of positive polarity and negative polarity signals output from the pair of sensor electrodes 234 and 235 of sensor element 230 can be integrated by single integration unit 302. An individual characteristic of individual integration circuit influences a relative error in integration results of input signals. Angular velocity sensor 1003 can reduce the influence on the relative error in the integration results of the pair of input signals more than a case that the integration is executed separately with two integration circuits. Similarly, DA conversion unit 294 includes the single DA conversion unit processes the pair of input signals. Similarly in comparator unit 303, the single comparator comparing the pair of integrated values with a single reference voltage can reduce the influence of characteristics of comparators and fluctuations in reference voltages on a relative error in the comparison result. As discussed above, sensor circuit 281 processes the pair of input signals with single integration circuit 296, single DA conversion unit 294, and single comparator unit 303. Thus arrangement reduces of the adverse influence on the relative errors among the number of individual components more than the case that plural integration circuits, plural DA conversion units, and plural of comparators perform the same processes.

In addition, in the case that the signals output from comparator unit 303 are one-bit signals having any of value "1" and value "0", a pair of comparison signals input to differential processing unit 309 for the one-bit differential operation to obtain a difference of the pair of input signals is limited only to one of the four combinations consisting of values "0" and "0", values "0" and "1", values "1" and "0", and values "1" and "1". Therefore, the difference is obviously one of values "0", "−1", "1", and "0". Differential processing unit 309 can thus perform the one-bit digital operation obtaining a result of subtraction of to the input signals with a simple circuit configuration.

Next, the one-bit differential signal output from one-bit differential processing unit 309 is input to correction processor 310 to be corrected with a predetermined correction factor by a substitution process. This correction operation utilizes the fact that the one-bit differential signal is limited to the three values "0", "1" and "−1", as described above. In the case that the predetermined correction factor is "5", for instance, the correction processor substitutes the input one-bit differential signal having a value of "0", "1", or "−1" with a value of "0", "5", or "−5", respectively. This executes e multiplication and can correct the signals.

The periods P201 and P202 are switching timings of input switching unit 242, DA switching unit 249, SW 254, SW 255, SW 256, and D-type flip-flop 260 of drive circuit 241. Timing generation circuit 322 generates and outputs timing signals φ201 and φ202 that define the periods P201 and P202, respectively. The periods P203, P204, P205 and P206 are switching timings of input switching unit 284, DA switching unit 287, SW 292, SW 293, SW 295, SW 300, SW 301, and D-type flip-flop 305. Timing generation circuit 323 generates and outputs timing signals φ203, φ204, φ205 and φ206 that define the periods P203, P204, P205 and P206, respectively.

As described above, angular velocity sensor 1003 has a stable output characteristic without producing periodical jitter noise as a phase error in the detection timing, and it is especially useful for attitude control, a navigation system and the like of a movable body such as an aircraft and motor vehicle.

Exemplary Embodiment 2

Figure 8A:
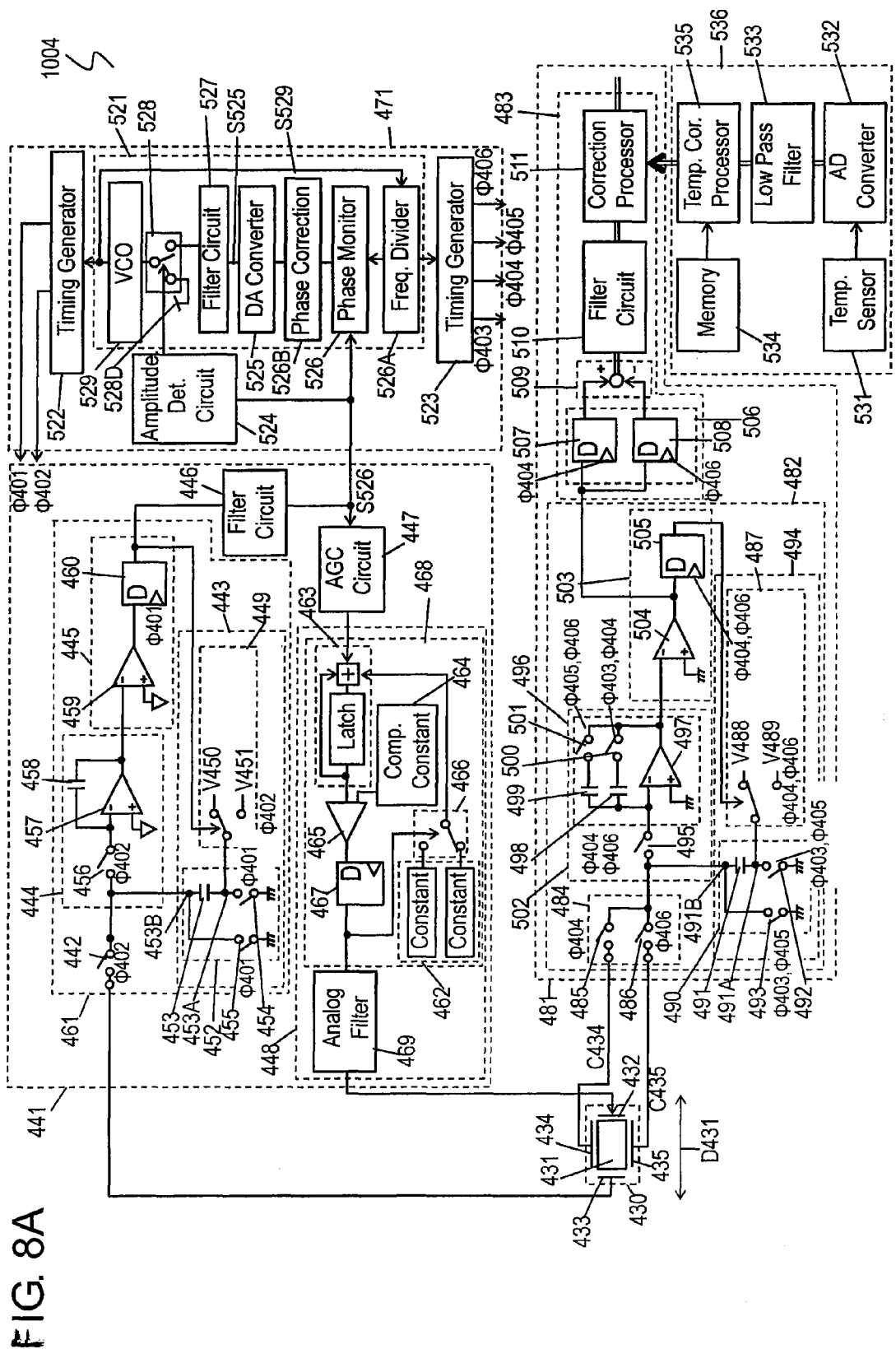
FIG. 8A is a circuit diagram of an angular velocity sensor according to Exemplary Embodiment 2 of the invention.

FIG. 8A is a circuit diagram of angular velocity sensor 1004 according to Exemplary Embodiment 2 of the present invention.

Sensor element 430 includes vibration body 431, driving electrode 432, monitor electrode 433, and sensor electrodes 434 and 435. Driving electrode 432 has a piezoelectric element for vibrating vibration body 431. Monitor electrode 433 has a piezoelectric element for generating an electric charge responsive to the vibration of vibration body 431. Sensor electrodes 434 and 435 have a piezoelectric element for generating electric charges corresponding to an angular velocity applied to sensor element 430. Sensor electrodes 434 and 435 generate electric charges having polarities opposite to each other.

FIG. 8B shows waveforms of timing signals φ401 and φ402 of angular velocity sensor 1004. Timing signals φ401 and φ402 have phases opposite to each other, and each of timing signals φ401 and φ402 has two values, a high level and a low level. Timing signal φ402 is at the high level and timing signal φ401 is at the low level during period P402. Timing signal φ402 is at the low level and timing signal φ401 is at the high level during period P401. Timing signals φ401 and φ402 alternately define periods P401 and P402 continuously.

Drive circuit 441 includes input switching unit 442, digital-to-analog (DA) conversion unit 443, integration unit 444, comparator unit 445, filter circuit 446 implemented by a digital filter, DA output unit 452, automatic gain control (AGC) circuit 447, and driver 448. Input switching unit 442 is connected with monitor electrode 433 provided on vibration body 431, and includes an analog switch activated by timing signal φ402. DA switching unit 449 selectively switches and outputs one of reference voltages V450 and V451 according to timing signal φ402. DA output unit 452 includes capacitor 453, switch (SW) 454 connected to one terminal 453A of capacitor 453, and SW 455 connected to the other terminal 453B of capacitor 453. The reference voltage output from DA switching unit 449 is input to terminal 453A of capacitor 453. SW 454 and SW 455 are activated by timing signal φ401, and discharge an electric charge of capacitor 453. DA switching unit 449 and DA output unit 452 constitute DA conversion unit 443. DA conversion unit 443 discharges the electric charge of capacitor 453 during the period P401, and either inputs or outputs an electric charge corresponding to the reference voltage output from DA switching unit 449 during the period P402. Signals output from input switching unit 442 and DA conversion unit 443 is input to SW 456, and SW 456 outputs the input signals during the period P402.

The signal output from SW 456 is input to integration unit 444. Integration unit 444 includes operational amplifier 457 and capacitor 458 connected between an output terminal and an inverting input terminal of operational amplifier 457. Integration unit 444 includes capacitor 458 to integrate the signal output from SW 456 during period P402, and outputs the integrated signal. The integrated signal output from integration unit 444 is input to comparator unit 445. Comparator unit 445 includes comparator 459 and D-type flip-flop 460. Comparator 459 compares the integrated signal output from integration unit 444 with a predetermined value, and outputs a one-bit digital signal. D-type flip-flop 460 latches the one-bit digital signal output from comparator 459 at the beginning of period P401, and outputs the latched signal. The latched signal is input to DA switching unit 449 of DA conversion unit 443 to switch the reference voltage V450 and V451. Input switching unit 442, DA conversion unit 443, integration unit 444, and comparator unit 445 constitute analog-to-digital (AD) converter 461 including a Σ-Δ modulator.

Filter circuit 446 extracts a signal of a resonant frequency component of vibration body 431 from a pulse-density modulated signal output from AD converter 461, and outputs a multi-bit signal that does not contain noise components. This multi-bit signal is input to automatic gain control (AGC) circuit 447, and converted into an amplitude signal representing amplitude of the multi-bit signal by a half-wave rectification filter circuit of AGC circuit 447. AGC circuit 447 attenuates amplitude of the multi-bit signal output from filter circuit 446 when the amplitude of the multi-bit signal is large, and inputs the attenuated multi-bit signal to driver 448. AGC circuit 447 amplifies the amplitude of the multi-bit signal when the amplitude is small, and inputs the amplified multi-bit signal to driver 448. AGC circuit 447 thus adjusts the amplitude of the multi-bit signal to cause vibration body 431 vibrate at a constant magnitude.

Driver 448 includes digital Σ-Δ modulator 468 including digital value output unit 462, summing integrator 463, value comparator 465, and flip-flop 467. Digital value output unit 462 has two different levels of fixed digital values, and selectively outputs one of the values. Summing integrator 463 adds and integrates the signal output from AGC circuit 447 and a signal output from digital value output unit 462. Value comparator 465 compares a signal output from summing integrator 463 with comparison constant value 464. Value switching unit 466 switches the digital value to be output from digital value output unit 462 according to an output of value comparator 465. Flip-flop 467 latches the signal output from value comparator 465 at predetermined timing. The multi-bit signal output from AGC circuit 447 is modulated to a one-bit pulse-density modulated signal by digital Σ-Δ modulator 468, and the one-bit pulse-density modulated signal is output from digital Σ-Δ modulator 468. Analog filter 469 filters out a frequency component not necessary for driving sensor element 430 from this pulse-density modulated signal, and outputs it to sensor element 430.

Timing control circuit 471 generates timing signals φ401 to φ406 based on the multi-bit signal output from filter circuit 446 of drive circuit 441, outputs timing signals φ401 and φ402 to drive circuit 441, and outputs timing signals φ403, φ404, φ405 and φ406 to sensor circuit 481.

FIG. 9 shows waveforms of timing signals φ403, φ404, φ405 and φ406. Timing signals φ403, φ404, φ405 and φ406 have two values of a high level and a low level. Timing signal φ403 is at the high level, and other timing signals φ404, φ405 and φ406 are at the low level during period P403. Timing signal φ404 is at the high level, and other timing signals φ403, φ405 and φ406 are at the low level during period P404. Timing signal φ405 is at the high level, and other timing signals φ403, φ404 and φ406 are at the low level during period P405. Timing signal φ406 is at the high level, and other timing signals φ403, φ404 and φ405 are at the low level during period P406. Timing signals φ403, φ404, φ405 and φ406 continuously define periods P403, P404, P405 and P406 in this order.

Sensor circuit 481 includes processing unit 483 and AD converter 482 implemented by a Σ-Δ modulator. Input switching unit 484 includes analog switch (SW) 485 connected to sensor electrode 434 of sensor element 430 and analog switch 486 connected to sensor electrode 435. Analog switches 485 and 486 are activated by timing signals φ04 and φ406, respectively. Input switching unit 484 outputs a signal output from sensor electrode 434 during the period P404, but does not output the signal in any of other periods P403, P405 and P406. In addition, input switching unit 484 outputs a signal output from sensor electrode 435 during the period P406, but does not output the signal in any of other periods P403, P404 and P405. DA switching unit 487 selectively switches and outputs one of reference voltages V488 and V489 in response to a predetermined signal. DA output unit 490 includes capacitor 491, SW 492 connected to one terminal 491A of capacitor 491, and SW 493 connected to the other terminal 491B of capacitor 491. SW 492 and SW 493 are activated by with timing signals φ403 and φ405, and discharge an electric charge of capacitor 491 during the periods P403 and P405. The signal output from DA switching unit 487 is input to terminal 491A of capacitor 491. DA switching unit 487 and DA output unit 490 constitute DA conversion unit 494. DA conversion unit 494 discharges the electric charge of capacitor 491 during the periods P403 and P405, and either inputs or outputs an electric charge corresponding to the reference voltage output from DA switching unit 487 during the periods P404 and P406.

SW 495 outputs a signal output from input switching unit 484 and another signal output from DA conversion unit 494 during the periods P404 and P406. The output of SW 495 is input to integration circuit 496. Integration circuit 496 includes operational amplifier 497, capacitors 498 and 499 connected between an output terminal and an inverting input terminal of operational amplifier 497, SW 500 connected in series to capacitor 498, and SW 501 connected in series to capacitor 499. SW 500 operates according to timing signals φ403 and φ404 so that capacitor 498 integrates the signals input to integration circuit 496 during the periods P403 and P404, and hold the integrated value. SW 501 operates according to timing signals φ405 and φ406 so that capacitor 499 integrates the signals input to integration circuit 496 during the periods P405 and P406, and holds the integrated value. SW 495 and integration circuit 496 constitute integration unit 502.

Comparator unit 503 includes comparator 504 and D-type flip-flop 505. Comparator 504 compares the integrated signal output from integration unit 502 with a predetermined value, and outputs a one-bit digital signal as a result of the comparison. D-type flip-flop 505 latches this one-bit digital signal at the beginning of periods P404 and P406, and outputs the latched signal. The latched signal is input to DA switching unit 487 of DA conversion unit 494, and switches the reference voltage V488 and V489. Input switching unit 484, DA conversion unit 494, integration unit 502, and comparator unit 503 constitute AD converter 482.

AD converter 482 having the above structure Σ-Δ modulates and converts the electric charges output from sensor electrodes 434 and 435 of sensor element 430 into one-bit digital signals, and output the one-bit digital signals.

Latch circuit 506 includes D-type flip-flops 507 and 508 for latching the one-bit digital signal output from comparator 504 of comparator unit 503 of AD converter 482. D-type flip-flop 507 operates with timing signal φ404 and latches the one-bit digital signal at the beginning of period P404. D-type flip-flop 508 operates with timing signal φ406 and latches the one-bit digital signal at the beginning of period P406. Differential processing unit 509 performs one-bit differential operation for computing a difference between the pair of the one-bit digital signals output from D-type flip-flops 507 and 508 by a substitution operation. In other words, differential processing unit 509 outputs a one-bit differential signal of value "0" when both the latched signals output from D-type flip-flops 507 and 508 have value of "0". Differential processing unit 509 outputs a one-bit differential signal of value "−1" when the latched signals output from D-type flip-flops 507 and 508 have values of "0" and "1", respectively. Differential processing unit 509 outputs a one-bit differential signal of value "1" when the latched signals output from D-type flip-flops 507 and 508 have values of "1" and "0", respectively. Differential processing unit 509 outputs a one-bit differential signal of value "0" when both the latch signals output from D-type flip-flops 507 and 508 have value of "1". Filter circuit 510 implemented by a digital filter filters the differential signal to remove a noise component in the digital differential signal output from differential processing unit 509. Correction processor 511 corrects the one-bit differential signal output from differential processing unit 509 by substitution operation. In the case that the predetermined correction factor is "5", for instance, correction processor 511 substitutes the one-bit differential signal having a value of "0", "1" or "−1" with a multi-bit digital differential signal of value "0", "5" or "−5", respectively, and outputs the digital differential signal. Latch circuit 506, differential processing unit 509, filter circuit 510, and correction processor 511 constitute processing unit 483. Processing unit 483 latches the one-bit digital signals output from D-type flip-flops 507 and 508 at the beginning of periods P404 and P406, performs the differential operation, the corrective operation and the filtering process, and outputs multi-bit digital signals.

Timing control circuit 471 includes PLL circuit 521, timing generation circuits 522 and 523, and amplitude determination circuit 524.

PLL circuit 521 reduces a phase noise by multiplying a frequency of the multi-bit signal output from filter circuit 446 of drive circuit 441 and by integrating the phase noise in time domain, and outputs the integrated signal to timing generation circuits 522 and 523. Phase monitor 526 receives a rectangular wave signal obtained by shaping the waveform of the multi-bit signal output from filter circuit 446 and a signal output from frequency divider 526A. Voltage-controlled oscillator (VCO) 529 generates oscillation signal S529 having frequency f529. Timing generation circuit 522 generates timing signals φ401 and φ402 based on oscillation signal S529, and outputs timing signals φ401 and φ402 to drive circuit 441. Frequency divider 526A divides the frequency of oscillation signal S529. A value that is output by drive circuit 441 or the AD converter in the timing of timing signal φ402 is a value corresponding to an amount of a phase difference between timing signal φ402 and a center value, i.e., the zero point of a sinusoidal wave signal. The signal output from phase monitor 526 is input to filter circuit 527 including a loop filter via phase correction circuit 526B, and filter circuit 527 converts the input signal into a direct-current (DC) signal by reducing AC components in the input signal. The signal output from filter circuit 527 and a voltage of constant value are input to timing switching unit 528. One of input terminals of timing switching unit 528 is connected with filter circuit 527 as described above, and the other input terminal is electrically connected with constant voltage source 528D.

A multi-bit signal output from filter circuit 446 is input to amplitude determination circuit 524. Amplitude determination circuit 524 monitors amplitude of the multi-bit signal output from filter circuit 446. When the amplitude is equal to or larger than target amplitude, timing switching unit 528 selects and outputs the output signal of filter circuit 527. On the other hand, when the amplitude is less than the target amplitude timing, switching unit 528 selects and outputs the voltage of constant value.

The voltage output from timing switching unit 528 is input to voltage-controlled oscillator 529. Voltage-controlled oscillator 529 is a variable frequency oscillator for generating an oscillation signal having a frequency corresponding to the input voltage. The oscillation signal output from voltage-controlled oscillator 529 is input to frequency divider 526A and timing generation circuits 522 and 523.

Timing generation circuit 522 generates timing signals ϕ401 and ϕ402 based on the signal output from PLL circuit 521, and outputs timing signals ϕ401 and ϕ402 to drive circuit 441. Timing generation circuit 523 frequency divides the monitor signal to change two cyclic periods of the monitor signal into periods P403, P404, P405 and P406. Timing generation circuit 523 generates timing signals ϕ403, ϕ404, ϕ405, and ϕ406 that define periods P403, P404, P405, and P406, respectively, and outputs timing signals ϕ403, ϕ404, ϕ405, and ϕ406 to sensor circuit 481.

Temperature sensor 531 detects an ambient temperature and outputs an analog signal corresponding to the detected temperature. AD converter 532 converts the analog signal output from temperature sensor 531 into a digital signal. Digital low-pass filter 533 removes a noise component from the signal output from AD converter 532. Memory 534 stores correction data used to perform offset adjustment at a predetermined reference temperature. Memory 534 includes a ROM. Based on the signal indicating a temperature received from digital low-pass filter 533, temperature correction processor 535 selects correction data corresponding to the temperature from memory 534, calculates a temperature correction value, and outputs it to correction processor 511 of processing unit 483 of sensor circuit 481. Temperature sensor 531, AD converter 532, digital low-pass filter 533, memory 534, and temperature correction processor 535 constitute temperature correction circuit 536.

An operation of angular velocity sensor 1004 according to Embodiment 2 will be described below.

When a driving signal is supplied to driving electrode 432 of sensor element 430, vibration body 431 resonates, and produces an electric charge in monitor electrode 433. The electric charge produced in monitor electrode 433 is input to AD converter 461 of drive circuit 441, and converted into a pulse-density modulated signal. This pulse-density modulated signal is input to filter circuit 446, and filter circuit 446 extracts a component of resonant frequency of vibration body 431 from the pulse-density modulated signal, and outputs a multi-bit signal having noise components removed.

An operation of AD converter 461 in this case will be described below. AD converter 461 operates according to timing signals ϕ401 and ϕ402 that define periods P401 and P402 that are repeated alternately in synchronization with the monitor signal output from timing control circuit 471, respectively. The signal output from monitor electrode 433 is Σ-Δ modulated and converted into a one-bit digital signal in the period P401.

An operation of angular velocity sensor 1004 in the periods P401 and P402 will be detailed below.

Figure 10:
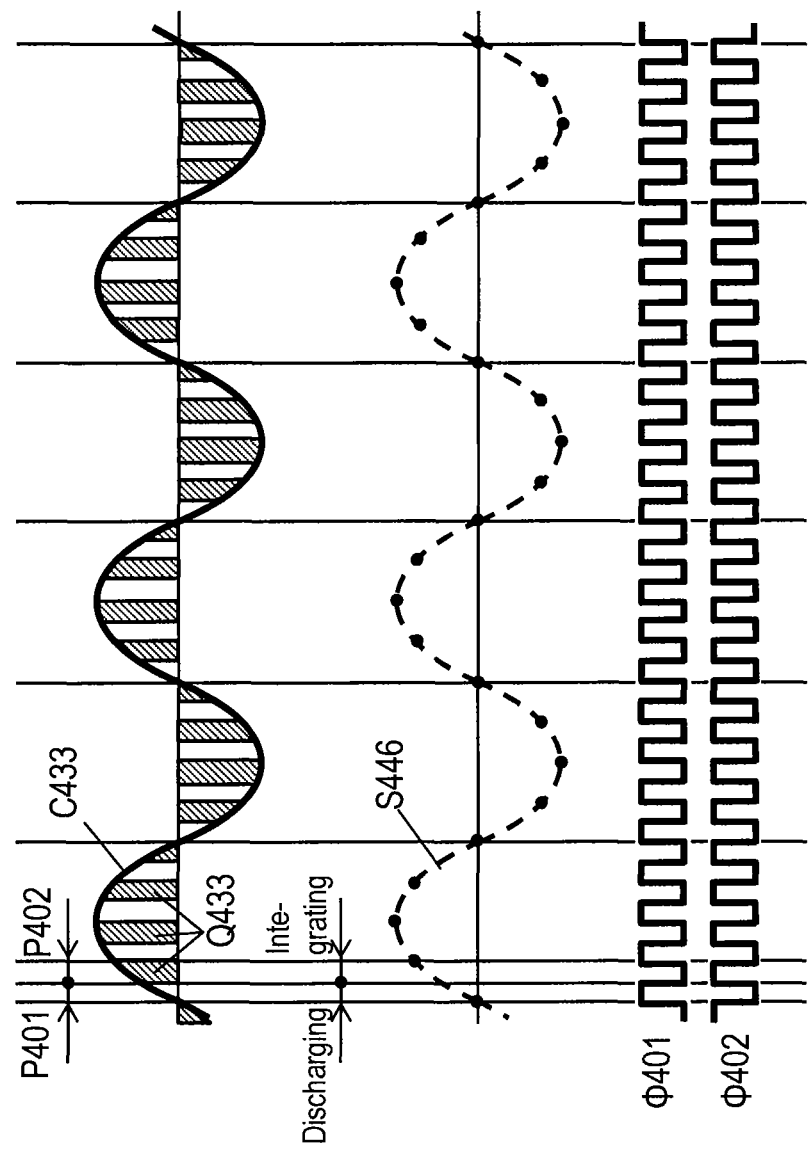
FIG. 10 shows signals of the angular velocity sensor according to Embodiment 2.

FIG. 10 shows timing signals ϕ401 and ϕ402 and signal C433 that appears in monitor electrode 433. During period P401, an integrated value stored in capacitor 458 of integration unit 444 is input to comparator 459 of comparator unit 445, and comparator 459 outputs a one-bit digital signal. The one-bit digital signal output from comparator 459 is latched by D-type flip-flop 460 at the beginning of period P401, and this latched signal is input to DA switching unit 449 of DA conversion unit 443. An electric charge held in capacitor 453 is discharged when SW 454 and SW 455 of DA output unit 452 are turned on.

Then, in the period P402, DA switching unit 449 switches reference voltages V450 and V451 and selectively output reference voltages V450 and V451 to capacitor 453 according to the signal input thereto. DA conversion unit 443 outputs an electric charge corresponding to the input reference voltage. In addition, input switching unit 442 is turned on to input the electric charge produced in monitor electrode 433 of sensor element 430. Furthermore, SW 456 of integration unit 444 is turned on to cause the electric charges output from input switching unit 442 and DA conversion unit 443 to be input to integration unit 444. As a result, the total sum in amount of electric charge Q433 shown in FIG. 10 and the electric charge output from DA conversion unit 443 is integrated and stored in capacitor 458 of integration unit 444 during the period P402.

The operation discussed above during the periods P401 and P402 Σ-Δ modulates the electric charge of the amount corresponding to the amplitude of output from monitor electrode 433 of sensor element 430, and it is output as a one-bit digital signal at the rise of timing signal ϕ401, i.e., the beginning of period P401.

AD converter 461 thus Σ-Δ modulates the electric charge of the amount corresponding to the amplitude of output from monitor electrode 433 of sensor element 430 and output it as the one-bit digital signal in the above-mentioned timing.

Multi-bit signal S446 shown in FIG. 10 output from filter circuit 446 in drive circuit 441 is input to a half-wave rectification/filter circuit of AGC circuit 447, and is converted into an amplitude signal that represents the amplitude of multi-bit signal S446. If this amplitude is large, AGC circuit 447 attenuates the multi-bit signal output from filter circuit 446 and inputs the attenuated signal to driver 448. On the other hand, if this amplitude is small, AGC circuit 447 amplifies the multi-bit signal and inputs the amplified signal to driver 448. AGC circuit 447 thus adjusts the multi-bit signal to cause vibration body 431 vibrate at a constant amplitude.

Digital value output unit 462 holds two predetermined constant values. Value switching unit 466 outputs one of these two constant values. The multi-bit signal output from AGC circuit 447 and the constant value output from value switching unit 466 are input to summing integrator 463 of digital Σ-Δ modulator 468. Summing integrator 463 adds and integrates the input signals, and outputs the integrated value. Value comparator 465 compares the integrated value output from summing integrator 463 with comparison constant value 464, and outputs a signal that represents a comparison result. This signal is then latched in a predetermined timing by flip-flop 467, and is output. A signal output from flip-flop 467 is used to switch the constant value to be output from value switching unit 466. In this case, value comparator 465 selects and outputs the larger one of two values output from digital value output unit 462 when the value output from summing integrator 463 is smaller than comparison constant value 464. If the value output from summing integrator 463 is larger than comparison constant value 464, then value comparator 465 selects and outputs the smaller one of the two values output from digital value output unit 462. By repeating this operation, the multi-bit signal output from AGC circuit 447 is modulated into a one-bit pulse-density modulated signal, and the modulated signal is output from flip-flop 467. In the case that the signal input to digital $\Sigma$-$\Delta$ modulator 468 has a value of 10 bits (=±9 bits), for example, it is desirable that comparison constant value 464 is set to value "0", and the two values output from digital value output unit 462 are set to "511" and "−511" or larger values.

Since $\Sigma$-$\Delta$ modulator 468 executes over-sampling to perform noise shaping of quantized noise to a high-frequency range, the signal output from AD converter 461 contains high frequency noise components. However, since sensor element 430 cannot respond to such a high frequency, vibration body 431 of sensor element 430 vibrates at an over-sampled predetermined frequency component rather than a sampling frequency of the pulse-density modulated signal. If sensor element 430 has a high response gain in the high frequency, noise of such high frequency may become a problem. Analog filter 469 has a function of reducing the frequency component that raises the problem, thereby providing drive circuit 441 with low noise and high accuracy.

While sensor element 430 having a mass m vibrates flexibly at velocity V in a driving direction D431 shown in FIG. 8A and rotates at angular velocity ω about the center axis in the longitudinal direction of vibration body 431, sensor element 430 receives Coriolis force F as follows.

$$F = 2 \times m \times V \times \omega$$

Figure 11:
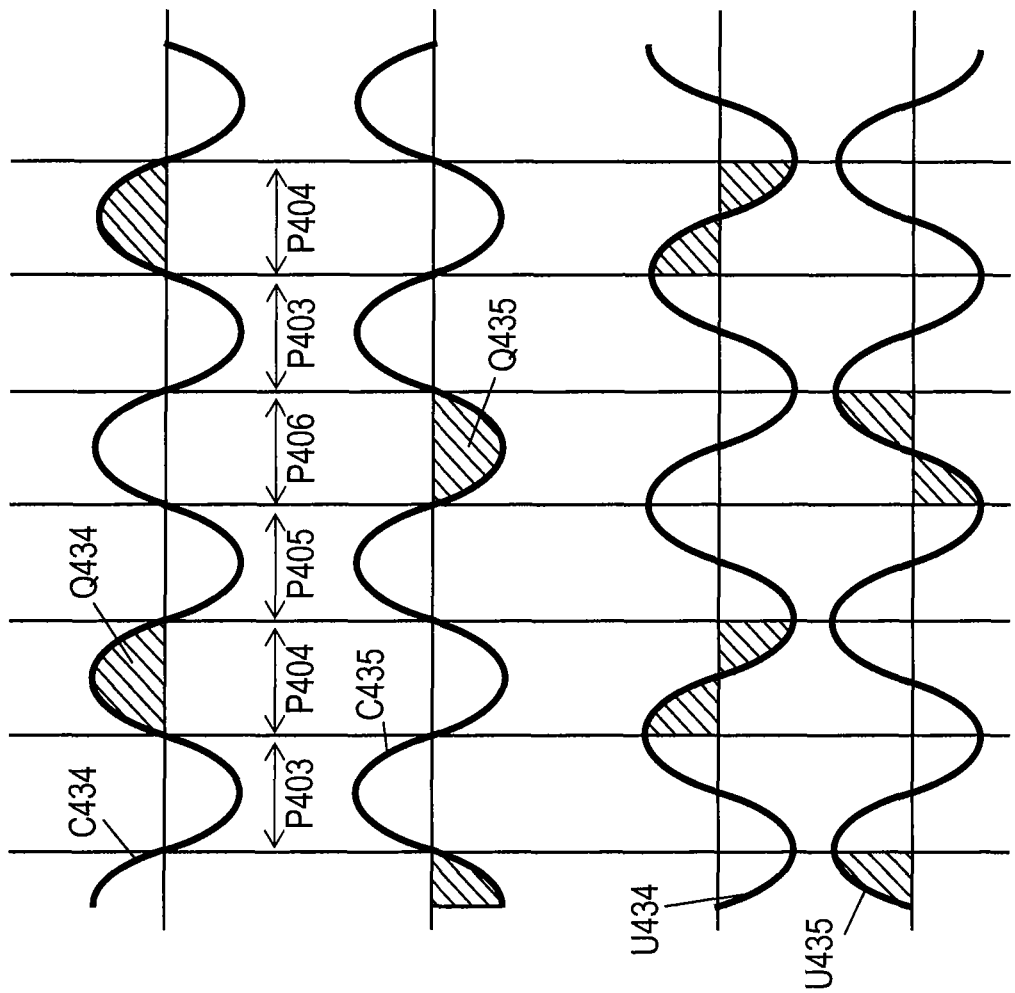
FIG. 11 shows other signals of the angular velocity sensor according to Embodiment 2.

FIG. 11 shows sensor signal C434 and undesired signal U434 output from sensor electrode 434 of sensor element 430, and sensor signal C435 and undesired signal U435 output from sensor electrode 435. The Coriolis force F induces electric charges in sensor electrodes 434 and 435 to generate sensor signals C434 and C435. Sensor signals C434 and C435 are generated by Coriolis force F, and hence, have sinusoidal waveforms with phases advancing by 90 degrees from the signal generated in monitor electrode 433. As shown in FIG. 11, sensor signals C434 and C435 are sinusoidal waves having phases inverse to each other, thus being a positive signal and a negative signal, respectively.

An operation of AD converter 482 in the above case will be described below. Timing signals φ403, φ404, φ405 and φ406 define periods P403, P404, P405 and P406 that repeat continuously in this order. AD converter 482 $\Sigma$-$\Delta$ modules sensor signal C434 output from sensor electrode 434 and converts sensor signal C434 into a one-bit digital signal during the periods P403 and P404. AD converter 482 also $\Sigma$-$\Delta$ modulates the negative signal output from sensor electrode 435 and converts the negative signal into a one-bit digital signal during the periods P405 and P406.

An operation of AD converter 482 during the periods P403, P404, P405 and P406 will be detailed below.

During the period P403, SW 500 connected with capacitor 498 of integration unit 502 is turned on, and an integrated value held in capacitor 498 is input to comparator 504 of comparator unit 503, which outputs a comparison result as a one-bit digital signal. In addition, SW 492 and SW 493 of DA conversion unit 494 are turned on to discharge an electric charge held in capacitor 491.

Then, during the period P404, a one-bit digital signal output from comparator 504 of comparator unit 503 is latched by D-type flip-flop 505 at the beginning of the period P404, and the latched signal is input to DA switching unit 487 of DA conversion unit 494. DA switching unit 487 switches and selects one of reference voltages V488 and V489 according to the signal input thereto, and inputs the selected reference voltage to capacitor 491. Hence an electric charge corresponding to the input reference voltage is output. SW 485 of input switching unit 484 is turned on to output the electric charge generated from sensor electrode 434. SW 495 of integration unit 502 is turned on to input the electric charges output from input switching unit 484 and DA conversion unit 494 to integration circuit 496. As a result, a total sum of an amount of electric charge Q434 shown in FIG. 11 and the electric charge output from DA conversion unit 494 is integrated and stored in capacitor 498 of integration circuit 496 during the period P404.

As described above, AD converter 482 $\Sigma$-$\Delta$ modulates an amount of electric charge equivalent to one-half of the amplitude value output from sensor electrode 434 out of two sensor electrodes 434 and 435 during the periods P403 and P404.

Similarly, during the periods P405 and P406 following the period P404 AD converter 482 $\Sigma$-$\Delta$ modulates on an amount of electric charge equivalent to one-half of the amplitude value output from sensor electrode 435.

The above operation causes the electric charge of the amount equivalent to a half of the amplitude value of the electric charges output from both sensor electrodes 434 and 435 is $\Sigma$-$\Delta$ modulated by single AD converter 482. Moreover, the $\Sigma$-$\Delta$ modulated electric charge is output as a pair of one-bit digital signals output from D-type flip-flops 507 and 508, respectively.

The electric charges output from sensor electrodes 434 and 435 of sensor element 430 contain not only the sensor signals generated by the Coriolis force attributed to the angular velocity and having the phase advancing by 90 degrees from the monitor signal generated in monitor electrode 433 but also undesired signals having a phase identical to the phase of the monitor signal. An operation of angular velocity sensor 1004 in this case will be described below. Integration circuit 496 integrates the electric charges of the amount equivalent to one-half of the amplitude value of sensor signals C434 and C435 generated by the Coriolis force F attributed to the angular velocity during the period P404 and P406. Undesired signals U434 and U435 generated in sensor electrodes 434 and 435 have phase identical to the monitor signal, but the phases shift by 90 degrees with respect to sensor signals C434 and C435. When integration circuit 496 integrates undesired signals U434 and U435 during the periods P404 and P406, the resulting value becomes "0" since an amount of the electric charge is integrated in the duration from maximum values to minimum values in the amplitudes of undesired signals U434 and U435 with reference to their center values, which cancel the charges. In other words, during the periods P404 and P406, integration unit 502 integrates the amount of electric charge corresponding to the amplitudes of sensor signals C434 and C435 while canceling undesired signals U434 and U435. That is, the so-called synchronous detection process is performed on sensor signals C434 and C435. Thus, AD converter 482 $\Sigma$-$\Delta$ modulates and converts the synchronous detected signal into a one-bit digital signal, and outputs the one-bit digital signal.

The above operation Σ-Δ modulates sensor signals C434 and C435 of sensor element 430 and synchronously detects sensor signals C434 and C435. Therefore, angular velocity sensor 1004 does not require conventional analog circuits, such as an I-V converter circuit, a phase shifter, or a synchronous detection circuit, to obtain a digital value of the synchronously-detected signal. Angular velocity sensor 1004 has small-sized circuits inexpensively, thus having a smaller size than sensors having analog circuits.

An operation of processing unit 483 will be described below. First, the one-bit digital signal output from comparator 504 of AD converter 482 is latched by D-type flip-flop 507 of latch circuit 506 at the beginning of the period P404. The one-bit digital signal output from comparator 504 is also latched in D-type flip-flop 508 of latch circuit 506 at the beginning of the period P406.

The amounts of electric charges equivalent to respective one-halves of the amplitude values of the signals output from the pair of sensor electrodes 434 and 435 of sensor element 430 are converted into digital values respectively by the Σ-Δ modulation. The pair of one-bit digital signals latched by D-type flip-flops 507 and 508 are these digital values. Next, the pair of one-bit digital signals output from latch circuit 506 is input to one-bit differential processing unit 509. Differential processing unit 509 calculates a difference between the one-bit digital signals and output the difference as a one-bit differential signal. The one-bit differential signal in the period P403 is the difference between the one-bit digital signals latched during the period P403 preceding periods P404 and P406. This one-bit differential signal represents an amplitude value of the signals shown in FIG. 11 that are output from the pair of sensor electrodes 434 and 435. According to the above operation, the pair of input signals that are positive and negative signals output from the pair of sensor electrodes 434 and 435 of sensor element 430 can be integrated by single integration unit 502. An individual characteristic of individual integration circuit influences a relative error in integration results of input signals. Angular velocity sensor 1004 can reduce the influence on the relative error in the integration results of the pair of input signals more than a case that the integration is executed separately with two integration circuits. Similarly, DA conversion unit 494 includes the single DA conversion unit processes the pair of input signals. Similarly in comparator unit 503, the single comparator comparing the pair of integrated values with a single reference voltage can reduce the influence of characteristics of comparators and fluctuations in reference voltages on a relative error in the comparison result. As discussed above, sensor circuit 481 processes the pair of input signals with single integration circuit 496, single DA conversion unit 494, and single comparator unit 503. Thus arrangement reduces of the adverse influence on the relative errors among the number of individual components more than the case that plural integration circuits, plural DA conversion units, and plural of comparators perform the same processes.

In addition, in the case that the signals output from comparator unit 503 are one-bit signals having any of value "1" and value "0", a pair of comparison signals input to differential processing unit 509 for the one-bit differential operation to obtain a difference of the pair of input signals is limited only to one of the four combinations consisting of values "0" and "0", values "0" and "1", values "1" and "0", and values "1" and "1". Therefore, the difference is obviously one of values "0", "−1", "1", and "0". Differential processing unit 509 can thus perform the one-bit digital operation obtaining a result of subtraction of to the input signals with a simple circuit configuration.

Next, the one-bit differential signal output from one-bit differential processing unit 509 is input to correction processor 511 to be corrected with a predetermined correction factor by a substitution process. This correction operation utilizes the fact that the one-bit differential signal is limited to the three values "0", "1" and "−1", as described above. In the case that the predetermined correction factor is "5", for instance, the correction processor substitutes the input one-bit differential signal having a value of "0", "1", or "−1" with a value of "0", "5", or "−5", respectively. This executes the multiplication.

The multi-bit signal output from filter circuit 446 is input to amplitude determination circuit 524 and phase monitor 526 in timing control circuit 471 as a rectangular wave signal obtained by shaping the waveform of the multi-bit signal. Amplitude determination circuit 524 monitors amplitude of the multi-bit signal output from filter circuit 446. When the amplitude is equal to or larger than 50% of target amplitude, timing switching unit 528 selects the signal output from filter circuit 527 and outputs the selected signal to voltage-controlled oscillator 529. At this moment, PLL circuit 521 works as a closed loop which multiplies the monitor signal of the driving frequency of vibration body 431 as an input signal, and outputs a signal having the phase noise reduced by integration in time domain. The signal synchronized with a specific driving frequency of sensor element 430 is thus input to timing generation circuits 522 and 523.

On the other hand, when the amplitude of the multi-bit signal output from filter circuit 446 is smaller than 50% of the target amplitude, timing switching unit 528 switches to select and output a constant voltage value to voltage-controlled oscillator 529. Accordingly, voltage-controlled oscillator 529 outputs an oscillation signal of a fixed frequency corresponding to the constant voltage value, and this signal is input to timing generation circuits 522 and 523.

An operation of PLL circuit 521 will be described below.

When an analog signal of sinusoidal wave is input, AD converter 461 samples the analog signal at the timing of timing signal φ401, and converts the sampled signal into a digital signal corresponding to amplitude of the input analog signal, and inputs the digital signal to phase monitor 526. For instance, the center value of the sinusoidal wave signal is converted into value "0" of this digital signal, and the sinusoidal wave signal is converted into positive and negative digital signals. Phase monitor 526 outputs a digital value input at the timing of timing signal φ402. This digital value is input to phase correction circuit 526B and corrected to a predetermined value, and then, input to DA converter 525. DA converter 525 converts the input digital value into an analog value, and outputs it. This analog signal is input to voltage-controlled oscillator 529 through filter circuit 527 including a loop filter. Voltage-controlled oscillator 529 outputs an oscillation signal having a frequency corresponding to the input analog signal, and the oscillation signal is fed back as a timing signal of AD converter 461. A value that is output from AD converter 461 in the timing of timing signal φ402 itself is a value corresponding to an amount of a phase difference between timing signal φ402 and a center value, i.e., the zero point of a sinusoidal wave signal. That is, the value output from AD converter 461 is the same value as that output from a phase comparator in an ordinary PLL circuit.

Figure 12:
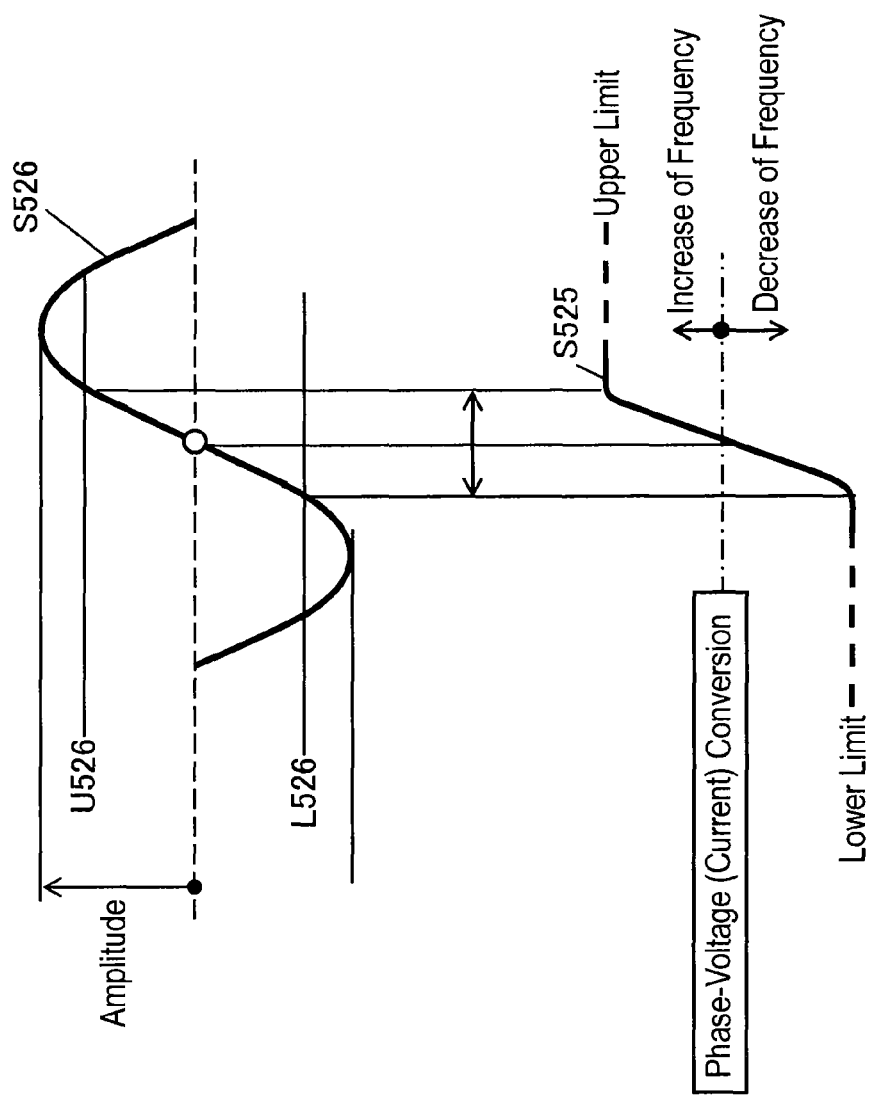
FIG. 12 illustrates operation of a PLL circuit of the angular velocity sensor according to Embodiment 2.

FIG. 12 shows analog signal S526 input to phase monitor 526 and analog signal S525 output from DA converter 525. As shown in FIG. 12, DA converter 525 outputs an analog signal that decreases the frequency output from voltage-controlled oscillator 529 when the digital value output from phase monitor 526 has a negative value. On the other hand, DA converter 525 outputs analog signal S525 that increases the frequency output from voltage-controlled oscillator 529 when the digital value output from phase monitor 526 has a positive value. As illustrated, PLL circuit 521 is loop-controlled to cause analog signal S525 output from DA converter 525 to be constant. That is, the digital value becomes "0" in the timing of timing signal ϕ402. This operation synchronizes the sampling timing of AD converter 461 with timing that crosses the center value of the input analog signal, and thus, synchronizes the timing accurately with the center value, i.e., the zero point of the analog signal.

Phase monitor 526 monitors the input digital value to determine whether the input digital value exceeds a predetermined upper limit U526, or it falls below a predetermined lower limit L526. The output value of phase monitor 526 changes at the timing of timing signal ϕ402.

Figure 13:
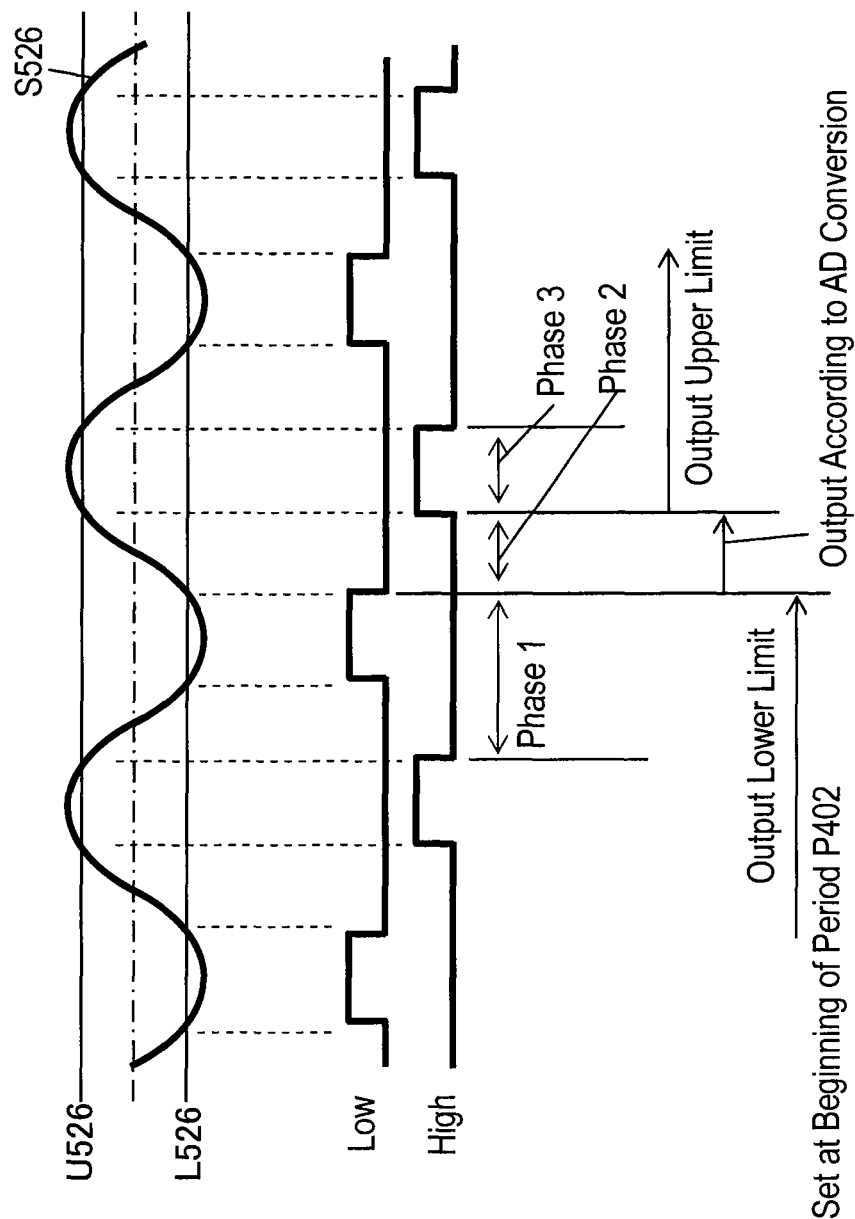
FIG. 13 illustrates an operation of the PLL circuit of the angular velocity sensor according to Embodiment 2.

FIG. 13 illustrates an operation of PLL circuit 521. More specifically, a time period defined as phase 1 starts when a digital value of analog signal S526 input after timing signal ϕ402 is supplied, i.e., after the start of period P402, falls below the upper limit U526 and then below the lower limit L526, and ends when the digital value rises above the lower limit L526. A time period defined as phase 2 starts from the end of phase 1 and ends when the input digital value exceeds the upper limit U526 first after the start of phase 2. A time period defined as phase 3 starts from the end of phase 2 and ends when analog signal S526 falls below the upper limit U526 first after the start of phase 3. Phase monitor 526 outputs the lower limit L526 when timing signal ϕ02 is input in phase 1, as shown in FIG. 13. Phase monitor 526 outputs the input digital value at the timing of timing signal ϕ402 when timing signal ϕ02 is input in phase 2. Phase monitor 526 outputs the upper limit U526 when timing signal ϕ02 is input in phase 3. DA converter 525 then receives the digital value output from phase monitor 526, and outputs an analog signal of the amplitude corresponding to this digital value. This analog signal is input to filter circuit 527 including a loop filter to filter the analog signal, and the filtered analog signal is input to voltage-controlled oscillator 529 through timing switching unit 528. Voltage-controlled oscillator 529 outputs a frequency determined based on the signal obtained by filtering the analog signal corresponding to the digital value output from phase monitor 526. Since phase monitor 526 has the functions of determining the phase and setting the upper limit U526 and the lower limit L526 of the output signal as discussed above, the analog signal input to voltage-controlled oscillator 529 is maintained within a predetermined range. As a result, the frequency of the signal output from voltage-controlled oscillator 529 can be restricted. This prevents malfunctions, such as so-called double frequency lock in which PLL circuit 521 locks at a frequency other than the frequency determined by multiplying the frequency of the input analog signal by a frequency dividing factor of the frequency divider in the overall operation of PLL circuit 521, thereby ensuring PLL circuit 521 to lock at the predetermined frequency.

Phase correction circuit 526B to which the signal output from phase monitor 526 is input changes the input phase comparison value by a predetermined value and outputs the changed value, and hence, can adjust the phase to be locked precisely by a resolution of the digital value. If phase correction circuit 526B adds a positive value to the input value, for instance, voltage-controlled oscillator 529 outputs a frequency that is higher by a value corresponding to the added value than the case without the addition, hence locking the frequency at a point of the phase shifted forward.

If the signals delay due to AD conversion or arithmetic operations in AD converter 461 by a certain number of clocks, the phase is locked while shifting by the amount of the delay.

However, the value output from phase monitor 526 is changed to a value corresponding to the timing shifted only by the number of clocks delayed from the timing of timing signal ϕ402. This operation can synchronizes timing signal ϕ402 with the timing that crosses the center value of the input analog signal. Hence, timing signal ϕ402 is synchronized accurately with the center value, i.e., the zero point of the analog signal.

The periods P401 and P402 represent switching timings of input switching unit 442, DA switching unit 449, SW 454, SW 455, SW 456, and D-type flip-flop 460 of drive circuit 441. Timing signals ϕ401 and ϕ402 define the periods P401 and P402, respectively. Timing generation circuit 522 generates and outputs timing signals ϕ401 and ϕ402 based on oscillation signal S529. Timing signals ϕ403, ϕ404, ϕ405 and ϕ406 represent switching timings of input switching unit 484, DA switching unit 487, SW 492, SW 493, SW 495, SW 500, SW 501, and D-type flip-flop 505 of sensor circuit 481. Timing signals ϕ403, ϕ404, ϕ405, and ϕ406 define the periods P403, P404, P405, and P406 respectively. Timing generation circuit 523 generates and outputs timing signals ϕ403, ϕ404, ϕ405 and ϕ406 based on oscillation signal S529.

An operation of angular velocity sensor 1004 upon a change in an ambient temperature of angular velocity sensor 1004 will be described below.

First, angular velocity sensor 1004 is placed in a thermostatic oven. Then, while the ambient temperature is changed from −50° C. to 150° C. and no angular velocity is applied, a temperature at which an output signal from processing unit 483 of sensor circuit 481 is zero is measured. The temperature is defined as a fiducial temperature.

Next, the change of the output signal is measured when the ambient temperature is increased and decreased from the fiducial temperature, and correction factors that correct the changes are stored in memory 534.

In the operating condition of angular velocity sensor 1004, the signal output from temperature sensor 531 is converted into a digital output signal with AD converter 532, and noise components in the signal are removed with digital low-pass filter 533. First, temperature correction processor 535 offset-adjusts the signal output from temperature sensor 531. Temperature correction processor 535 then retrieves, from memory 534, a correction factor out of the correction factors corresponding to the offset-adjusted signal, arithmetically processes the factor, and inputs the correction factor to correction processor 511. Correction processor 511 corrects a signal output from sensor circuit 481 according to the correction factor. The corrected signal does not contain an offset. In a graph having an X-axis representing temperatures and a Y-axis representing the signal, no offset appears in the signal after the correction even when a change occurs in the X intercept of the signal output from temperature sensor 531, thereby providing angular velocity sensor 1004 with a stable output characteristic.

Figure 15:
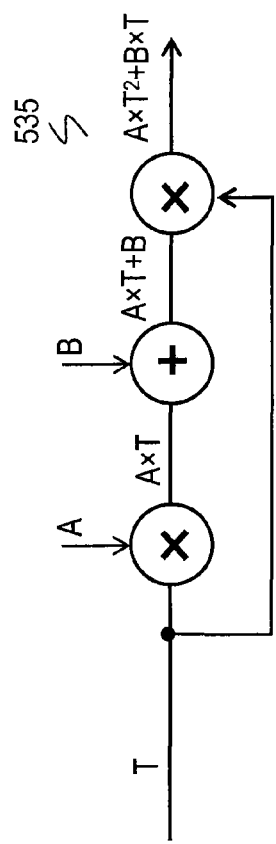
FIG. 15 is a block diagram of a temperature correction processor of the angular velocity sensor according to Embodiment 2.
Figure 14:
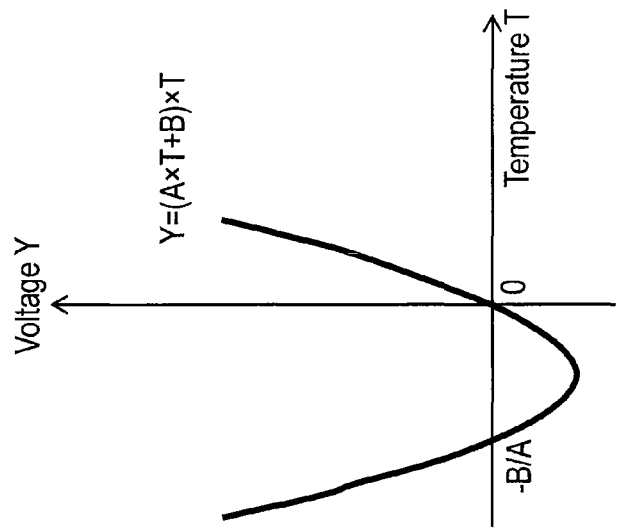
FIG. 14 shows correction data of the angular velocity sensor according to Embodiment 2.

FIG. 14 shows the correction factors. FIG. 15 illustrates a block diagram of temperature correction processor 535. Correction factor Y shown in FIG. 14 is expressed with the temperature T and constants And V by the following quadratic equation.

$$Y = (A \times T + B) \times T$$

In this case, memory 534 stores two constants A and B. Temperature correction processor 535 obtains correction factor Y by performing two steps of multiplication and a step of addition based on a signal representing temperature T output from digital low-pass filter 533. Correction processor 511 corrects the signal output from sensor circuit 481 by adding correction factor Y to the signal output from filter circuit 510. Since this corrective operation requires only the two steps of multiplication to correct the signal, it can reduce a number of the operation processes.

A start-up operation of the angular velocity sensor turned on at a certain temperature will be described below. In the normal operation of temperature correction circuit 536, the output of temperature sensor 531 is AD-converted into a digital value, and is input to digital low-pass filter 533. Temperature correction processor 535 calculates correction factor Y according to a signal output from digital low-pass filter 533, and corrects the output signal of sensor circuit 481. At the start-up of the sensor turned on, however, the signal representing temperature T fluctuates sue to a response time of digital low-pass filter 533 until the output follows the input of digital low-pass filter 533. A correction factor resulting from such a fluctuating signal is added to the output signal of sensor circuit 481. Therefore, the signal output from sensor circuit 481 changes according to the response time of digital low-pass filter 533.

In angular velocity sensor 1004 according to Embodiment 2, an additional clock is provided separately from the clock used in the normal operation, and this clock has a sampling frequency ten times that of the normal clock to operate digital low-pass filter 533 during the start-up. This increases the cutoff frequency of digital low-pass filter 533 by ten times, and therefore increases the response speed accordingly. A result is an advantage of accurately removing the noise signal contained in the signal output from temperature sensor 531 during the normal operation, thereby causing temperature correction processor 535 to produce a correction signal based on the accurate temperature. The increase of the response speed of digital low-pass filter 533 decreases the time to output the accurate correction factor, and shortens the time before a signal can be output while accurate angular velocity is not applied during the start-up.

Figure 16:
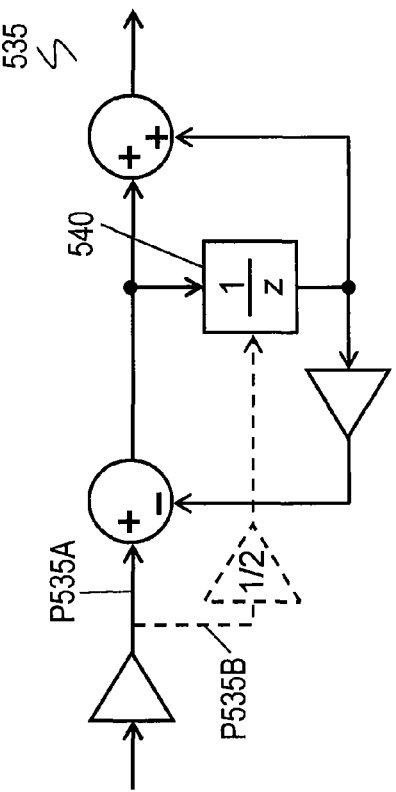
FIG. 16 is a block diagram of another temperature correction processor of the angular velocity sensor according to Embodiment 2.

FIG. 16 is block diagram of another temperature correction processor 535 for increasing the response speed of digital low-pass filter 533 during the start-up. Temperature correction processor 535 shown in FIG. 16 is a first-order IIR filter, and includes delay element 540 implemented by a register. During the start-up, delay element 540 is reset normally, and outputs an initial value. A delay corresponding to a response speed of digital low-pass filter 533 is produced by the time the output follows the input of digital low-pass filter 533. A signal output from temperature sensor 531 at the start-up is routed only once through passage R535B, and AD-converted to obtain a digital value. The obtained value is input to delay element 540 of digital low-pass filter 533, and it is assigned as an initial value. After that, the signal output from temperature sensor 531 is supplied through passage R535A and AD-converted to obtain a value. This method expedites settling the output of digital low-pass filter 533, and therefore, provides a similar advantage As discussed above, angular velocity sensor 1004 has a stable output characteristic without causing offset even when a change occurs in the X intercept of the signal output from the temperature sensor, and it is useful especially for attitude control, a navigation system and the like of a movable body such as an aircraft and motor vehicle.

Exemplary Embodiment 3

Figure 17A:
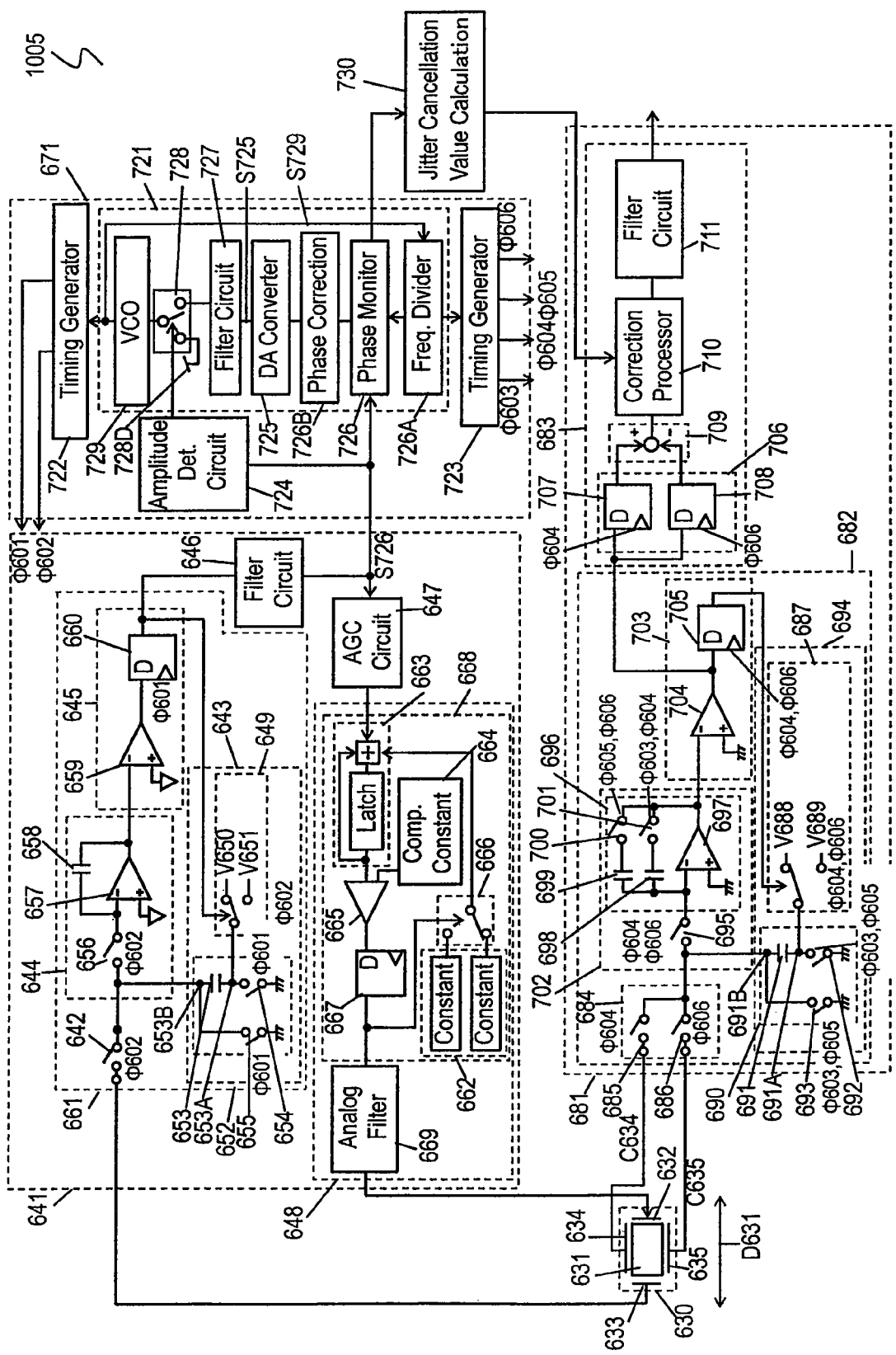
FIG. 17A is a circuit diagram of an angular velocity sensor according to Exemplary Embodiment 3 of the invention.

FIG. 17A is a circuit diagram of angular velocity sensor 1005 according to Exemplary Embodiment 3 of the present invention.

Sensor element 630 includes vibration body 631, driving electrode 632 and sensor electrodes 634 and 635. Driving electrode 632 has a piezoelectric element for vibrating vibration body 631. Monitor electrode 633 has a piezoelectric element for generating an electric charge responsive to the vibration of vibration body 631. Sensor electrodes 634 and 635 also have a piezoelectric element for generating electric charges corresponding to an angular velocity applied to sensor element 630. Sensor electrodes 634 and 635 generate electric charges having polarities opposite to each other.

Figure 17B:
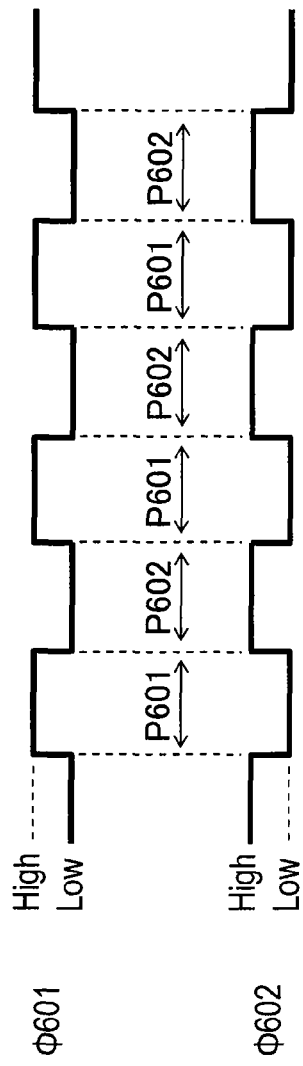
FIG. 17B shows timing signals of the angular velocity sensor according to Embodiment 3.

FIG. 17B shows waveforms of timing signals φ601 and φ602 of angular velocity sensor 1005. Timing signals φ601 and φ602 have phases opposite t each other. Each of timing signals φ601 and φ602 has two values, a high level and a low level. Timing signal φ602 is at the high level and timing signal φ601 is at the low level during period P602. Timing signal φ602 is at the low level and timing signal φ601 is at the high level during period P601. Timing signals φ601 and φ602 alternately define periods P601 and P602 continuously.

Drive circuit 641 includes input switching unit 642, digital-to-analog (DA) conversion unit 643, integration unit 644, comparator unit 645, filter circuit 646 implemented by a digital filter, DA output unit 652, automatic gain control (AGC) circuit 647m and driver 648. Input switching unit 642 is connected with monitor electrode 633 provided on vibration body 631, and includes an analog switch activated by timing signal φ602. DA switching unit 649 selectively switches and outputs one of reference voltages V650 and V651 according to timing signal φ602. DA output unit 652 includes capacitor 653, switch (SW) 654 connected to one terminal 653A of capacitor 653, and SW 655 connected to the other terminal 653B of capacitor 653. The reference voltage output from DA switching unit 649 is input to terminal 653A of capacitor 653. SW 654 and SW 655 operate according to timing signal φ601, and discharge an electric charge of capacitor 653. DA switching unit 649 and DA output unit 652 constitute DA conversion unit 643. DA conversion unit 643 discharges the electric charge of capacitor 653 during the period P601, and either inputs or outputs an electric charge corresponding to the reference voltage output from DA switching unit 649 during the period P602. SW 656 receives signals output from input switching unit 642 and DA conversion unit 643, and outputs the received signal during the period P602.

The signal output from SW 656 is input to integration unit 644. Integration unit 644 includes operational amplifier 657 and capacitor 658 connected between an output terminal and an inverting input terminal of operational amplifier 657. Integration unit 644 including capacitor 658 to integrate the signal output from SW 656, and outputs the integrated signal during the period P602. Comparator unit 645 includes comparator 659 and D-type flip-flop 660. Comparator 659 compares the integrated signal output from integration unit 644 with a predetermined value, and outputs a one-bit digital signal. D-type flip-flop 660 latches the one-bit digital signal output from comparator 659 at the beginning of period P601, and outputs the latched signal. The latched signal is input to DA switching unit 649 of DA conversion unit 643, and DA switching unit 649 switches the reference voltage V650 and the reference voltage V651. Input switching unit 642, DA conversion unit 643, integration unit 644, and comparator unit 645 constitute analog-to-digital (AD) converter 661 implemented by a Σ-Δ modulator that outputs a pulse-density modulated signal.

Filter circuit 646 extracts a signal of a resonant frequency component of vibration body 631 from the pulse-density modulated signal output from AD converter 661, and outputs a multi-bit signal having a noise component removed. This multi-bit signal is input to automatic gain control (AGC) circuit 647, and converted into an amplitude signal representing amplitude of the multi-bit signal by a half-wave rectifying and filtering circuit in AGC circuit 647. AGC circuit 647 reduces amplitude of the multi-bit signal output from filter circuit 646 when the amplitude of the multi-bit signal is large, and inputs the reduced multi-bit signal to driver 648. AGC circuit 647 increase the amplitude of the multi-bit signal when the amplitude of the multi-bit signal is small, and inputs the increased multi-bit signal to driver 648. AGC circuit 647 adjusts the multi-bit signal to cause vibration body 631 to vibrate with constant amplitude.

Driver 648 includes digital Σ-Δ modulator 668 including digital value output unit 662, summing integrator 663, value comparator 665, value switching unit 666 and flip-flop 667. Digital value output unit 662 holds two different levels of fixed digital values, and outputs one of the levels selectively. Summing integrator 663 adds and integrates the signal output from AGC circuit 647 and a signal output from digital value output unit 662. Value comparator 665 compares a signal output from summing integrator 663 with comparison constant value 664. Value switching unit 666 switches the digital value to be output from digital value output unit 662 according to an output of value comparator 665. Flip-flop 667 latches the signal output from value comparator 665 at predetermined timing. The multi-bit signal output from AGC circuit 647 is modulated into a one-bit pulse-density modulated signal, and output from digital Σ-Δ modulator 668. Analog filter 669 filters out a component of a frequency not necessary for driving sensor element 630 from this pulse-density modulated signal, and outputs it to sensor element 630.

Timing control circuit 671 generates timing signals φ601 to φ606 based on the multi-bit signal output from filter circuit 646, outputs timing signals φ601, and φ602 to drive circuit 641, and outputs timing signals φ603, φ604, φ605, and φ606 to sensor circuit 681.

Figure 18:
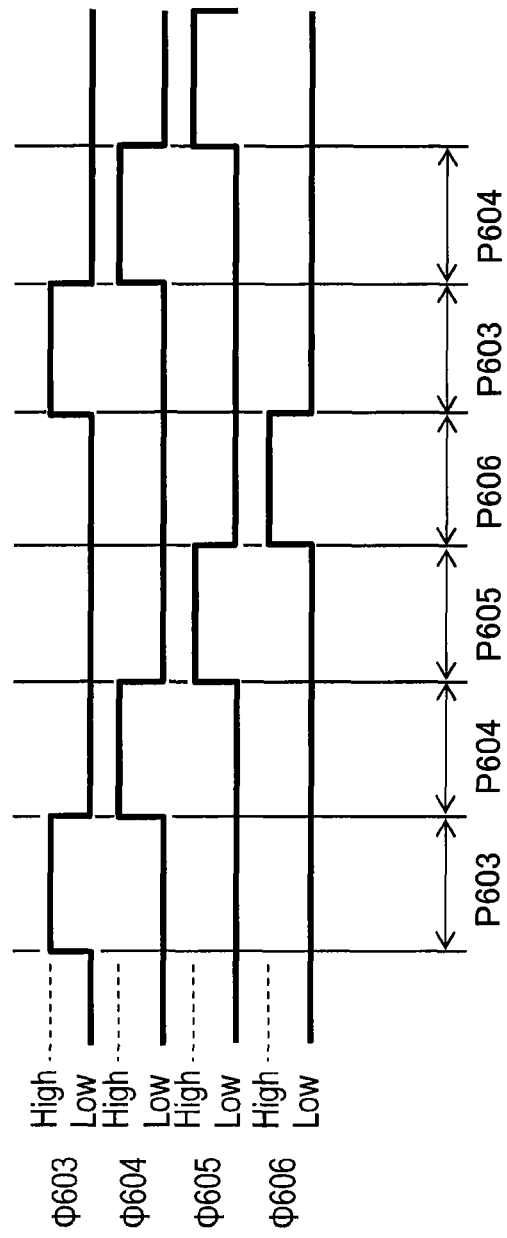
FIG. 18 shows other timing signals of the angular velocity sensor according to Embodiment 3.

FIG. 18 shows waveforms of timing signals φ603, φ604, φ605, and φ606. Each of timing signals φ603, φ604, φ605, and φ606 has two values, a high level and a low level. Timing signal φ603 is at the high level, and other timing signals φ604, φ605, and φ606 are at the low level during period P603. Timing signal φ604 is at the high level, and other timing signals φ603, φ605, and φ606 are at the low level during period P604. Timing signal φ605 is at the high level, and other timing signals φ603, φ604, and φ606 are at the low level during period P605. Timing signal φ606 is at the high level, and other timing signals φ603, φ604, and 0605 are at the low level during period P606. Timing signals φ603, φ604, φ605, and φ606 continuously define periods P603, P604, P605, and P606 in this order.

Sensor circuit 681 includes AD converter 682 implemented by a Σ-Δ modulator, and processing unit 683. Input switching unit 684 includes analog switches (SW) 685 and 686 connected to sensor electrodes 634 and 635 of sensor element 630, respectively. Analog switches (SW) 685 and 686 are activated by timing signals φ604 and φ606, respectively. Input switching unit 684 outputs a signal output from sensor electrode 634 during period P604, but does not outputs the signal during other periods P603, P605 and P606. In addition, input switching unit 684 outputs a signal output from sensor electrode 635 during period P606, but not output the signal during other periods P603, P604 and P605. DA switching unit 687 selectively switches and outputs one of reference voltages V688 and V689 in response to a predetermined signal. DA output unit 690 includes capacitor 691, SW 692 connected to one terminal 691A of capacitor 691, and SW 693 connected to the other terminal 691B of capacitor 691. SW 692 and SW 693 are activated by timing signals φ603 and φ605, and discharge an electric charge of capacitor 691 during periods P603 and P605, respectively. The signal output from DA switching unit 687 is input to terminal 691A of capacitor 691. DA switching unit 687 and DA output unit 690 constitute DA conversion unit 694. DA conversion unit 694 discharges the electric charge of capacitor 691 during the periods P603 and P605, and either inputs or outputs an electric charge corresponding to the reference voltage output from DA switching unit 687 during the periods P604 and P606.

SW 695 outputs a signal output from input switching unit 684 and another signal output from DA conversion unit 694 during the periods P604 and P606. The signal output from SW 695 is input to integration circuit 696. Integration circuit 696 includes operational amplifier 697, capacitors 698 and 699 connected between an output terminal and an inverting input terminal of operational amplifier 697, and SW 700 connected in series to capacitor 698, and SW 701 connected in series to capacitor 699. SW 700 operates according to timing signals φ603 and φ604 so that capacitor 698 integrates the signal input to integration circuit 696 during the periods P603 and P604, and holds the integrated signal. SW 701 operates according to timing signals φ605 and φ606 so that capacitor 699 integrates the signal input to integration circuit 696 during the periods P605 and P606, and holds the accumulated signal. SW 695 and integration circuit 696 constitute integration unit 702.

Comparator unit 703 includes comparator 704 and D-type flip-flop 705. Comparator 704 compares the integrated signal output from integration unit 702 with a predetermined value, and outputs a one-bit digital signal as a result of the comparison. D-type flip-flop 705 latches this one-bit digital signal at the beginning of periods P604 and P606, and outputs the latched signal. The latched signal is input to DA switching unit 687 of DA conversion unit 694. DA switching unit 687 switches the reference voltages V688 and V689. Input switching unit 684, DA conversion unit 694, integration unit 702, and comparator unit 703 constitute AD converter 682.

AD converter 682 thus converts the electric charges output from sensor electrodes 634 and 635 of sensor element 630 into the one-bit digital signals by performing a Σ-Δ modulation, and output the digital signals.

Latch circuit 706 includes D-type flip-flops 707 and 708 for latching the one-bit digital signal output from comparator 704 of comparator unit 703 of AD converter 682. D-type flip-flop 707 operates according to timing signal φ604 and latches the one-bit digital signal at the beginning of period P604, and outputs the latched signal. D-type flip-flop 708 operates according to timing signal φ606 and latches the one-bit digital signal at the beginning of period P606, and outputs the latched signal. Differential processing unit 709 performs a one-bit differential operation for calculating the difference between the latch signals output from D-type flip-flops 707 and 708 by a substitution operation. In other words, differential processing unit 709 outputs a one-bit differential signal of value "0" when both of the latched signals output from D-type flip-flops 707 and 708 have value of "0". Differential processing unit 709 outputs a one-bit differential signal of value "−1" when the latched signals output from D-type flip-flops 707 and 708 have values of "0" and "1", respectively. Differential processing unit 709 outputs a one-bit differential signal of value "1" when the latched signals output from D-type flip-flops 707 and 708 have values of "1" and "0", respectively. Differential processing unit 709 outputs a one-bit differential signal of value "0" when both the latched signals output from D-type flip-flops 707 and 708 have value of "1". Correction processor 710 corrects the one-bit differential signal output from differential processing unit 709 by a substitution operation based on a predetermined correction factor. That is, correction processor 710 substitutes the one-bit differential signal having a value of "0", "1" or "−1" with a multi-bit digital differential signal of value "0", "5" or "−5", respectively, when the predetermined correction factor is "5", for instance, and outputs the digital differential signal. Filter circuit 711 including a digital filter performs a filtering process of removing a noise component in the digital differential signal output from correction processor 710. Latch circuit 706, differential processing unit 709, correction processor 710 and filter circuit 711 constitute processing unit 683. Processing unit 683 latches the one-bit digital signals output from D-type flip-flops 707 and 708 at the beginnings of periods P604 and P606, performs the differential operation, the correction, and the filtering, and outputs multi-bit digital signals.

Timing control circuit 671 includes PLL circuit 721, timing generation circuits 722 and 723, and amplitude determination circuit 724.

PLL circuit 721 reduces a phase noise by multiplying a frequency of the multi-bit signal output from filter circuit 646 of drive circuit 641 and by integrating the phase noise in time domain, and outputs the integrated signal to timing generation circuits 722 and 723. Phase monitor 726 receives a rectangular wave signal obtained by shaping the waveform of the multi-bit signal output from filter circuit 646 and a signal output from frequency divider 726A. Voltage-controlled oscillator (VCO) 729 generates oscillation signal S729 having frequency f729. Timing generation circuit 722 generates timing signals φ601 and φ602 based on oscillation signal S729, and outputs timing signals φ601 and φ602 to drive circuit 641. Frequency divider 726A divides the frequency of oscillation signal S729. A value that is output from drive circuit 641 or the AD converter in the timing of timing signal φ602 itself is a value corresponding to an amount of a phase difference between timing signal φ602 and a center value, i.e., the zero point of a sinusoidal wave signal. A signal output from phase monitor 726 is input to filter circuit 727 including a loop filter via phase correction circuit 726B, and filter circuit 727 converts the input signal into a direct-current (DC) signal by reducing alternating-current (AC) components in the input signal. The signal output from filter circuit 727 and a voltage of constant value are input to timing switching unit 728. One of input terminals of timing switching unit 728 is connected with filter circuit 727 as stated above, and the other input terminal is electrically connected with constant voltage source 728D.

A multi-bit signal output from filter circuit 646 is input to amplitude determination circuit 724. Amplitude determination circuit 724 monitors amplitude of the multi-bit signal output from filter circuit 646. When the amplitude is equal to or larger than target amplitude, timing switching unit 728 selects and outputs the output signal of filter circuit 727. On the other hand, when the amplitude is less than the target amplitude timing, switching unit 728 selects and outputs the voltage of constant value.

The voltage output from timing switching unit 728 is input to voltage-controlled oscillator 729. Voltage-controlled oscillator 729 is a variable frequency oscillator for generating an oscillation signal having a frequency corresponding to the input voltage. The oscillation signal output from voltage-controlled oscillator 729 is input to frequency divider 726A and timing generation circuits 722 and 723. The signal output from phase monitor 726 of PLL circuit 721 is also input to jitter cancellation value calculation circuit 730. A signal output from jitter cancellation value calculation circuit 730 is input to correction processor 710 of sensor circuit 681.

Timing generation circuit 722 generates timing signals φ601 and φ602 based on the signal output from PLL circuit 721, and outputs timing signals φ601 and φ602 to drive circuit 641. Timing generation circuit 723 frequency divides the monitor signal to change two cyclic periods of the monitor signal into periods P603, P604, P605 and P606. Timing generation circuit 723 generates timing signals φ603, φ604, φ605, and φ606 that define periods P603, P604, P605, and P606, respectively, and outputs timing signals φ603, φ604, φ605, and φ606 to sensor circuit 681.

An operation of angular velocity sensor 1005 according to Embodiment 3 will be described below.

When a driving signal is supplied to driving electrode 632 of sensor element 630, vibration body 631 resonates, and produces an electric charge in monitor electrode 633. The electric charge produced in monitor electrode 633 is input to AD converter 661 of drive circuit 641, and converted into a pulse-density modulated signal. This pulse-density modulated signal is input to filter circuit 646, and filter circuit 646 extracts a component of resonant frequency of vibration body 631 from the pulse-density modulated signal, and outputs a multi-bit signal having noise components removed.

An operation of AD converter 661 in this case will be described below. AD converter 661 operates according to timing signals φ601 and φ602 that define periods P601 and P602 that are repeated alternately in synchronization with the monitor signal output from timing control circuit 671, respectively. The signal output from monitor electrode 633 is Σ-Δ modulated and converted into a one-bit digital signal in the period P601.

An operation of angular velocity sensor 1005 in the periods P601 and P602 will be described below.

FIG. 18 shows timing signals φ601 and φ602 and signal C633 that appears in monitor electrode 633. During period P601, an integrated value stored in capacitor 658 of integration unit 644 is input to comparator 659 of comparator unit 645, and comparator 659 outputs a one-bit digital signal. The one-bit digital signal output from comparator 659 is latched by D-type flip-flop 660 at the beginning of period P601, and this latched signal is input to DA switching unit 649 of DA conversion unit 643. An electric charge held in capacitor 653 is discharged when SW 654 and SW 655 of DA output unit 652 are turned on.

Then, in the period P602, DA switching unit 649 switches reference voltages V650 and V651 and selectively output reference voltages V650 and V651 to capacitor 653 according to the signal input thereto. DA conversion unit 643 outputs an electric charge corresponding to the input reference voltage. In addition, input switching unit 642 is turned on to input the electric charge produced in monitor electrode 633 of sensor element 630. Furthermore, SW 656 of integration unit 644 is turned on to cause the electric charges output from input switching unit 642 and DA conversion unit 643 to be input to integration unit 644. As a result, the total sum in amount of electric charge Q633 shown in FIG. 19 and the electric charge output from DA conversion unit 643 is integrated and stored in capacitor 658 of integration unit 644 during the period P602.

The operation discussed above during the periods P601 and P602 Σ-Δ modulates the electric charge of the amount corresponding to the amplitude of output from monitor electrode 633 of sensor element 630, and it is output as a one-bit digital signal at the rise of timing signal φ601, i.e., the beginning of period P601.

AD converter 661 thus Σ-Δ modulates the electric charge of the amount corresponding to the amplitude of output from monitor electrode 633 of sensor element 630 and output it as the one-bit digital signal in the above-mentioned timing.

Figure 19:
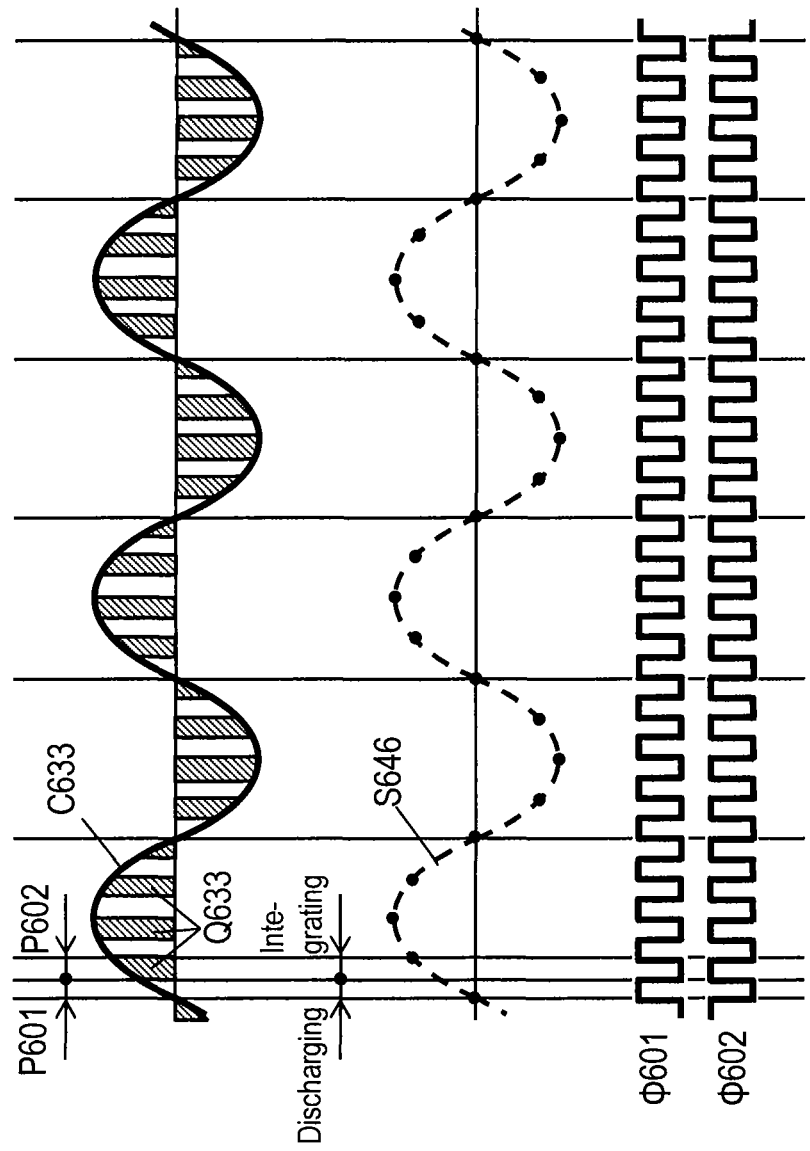
FIG. 19 shows signals of the angular velocity sensor according to Embodiment 3.

Multi-bit signal S646 shown in FIG. 19 output from filter circuit 646 in drive circuit 641 is input to a half-wave rectification/filter circuit of AGC circuit 647, and is converted into an amplitude signal that represents the amplitude of multi-bit signal S646. If this amplitude is large, AGC circuit 647 attenuates the multi-bit signal output from filter circuit 646 and inputs the attenuated signal to driver 648. On the other hand, if this amplitude is small, AGC circuit 647 amplifies the multi-bit signal and inputs the amplified signal to driver 648. AGC circuit 647 thus adjusts the multi-bit signal to cause vibration body 631 vibrate at a constant amplitude.

Digital value output unit 662 holds two predetermined constant values. Value switching unit 666 outputs one of these two constant values. The multi-bit signal output from AGC circuit 647 and the constant value output from value switching unit 666 are input to summing integrator 663 of digital Σ-Δ modulator 668. Summing integrator 663 adds and integrates the input signals, and outputs the integrated value. Value comparator 665 compares the integrated value output from summing integrator 663 with comparison constant value 664, and outputs a signal that represents a comparison result. This signal is then latched in a predetermined timing by flip-flop 667, and is output. A signal output from flip-flop 667 is used to switch the constant value to be output from value switching unit 666. In this case, value comparator 665 selects and outputs the larger one of two values output from digital value output unit 662 when the value output from summing integrator 663 is smaller than comparison constant value 664. If the value output from summing integrator 663 is larger than comparison constant value 664, then value comparator 665 selects and outputs the smaller one of the two values output from digital value output unit 662. By repeating this operation, the multi-bit signal output from AGC circuit 647 is modulated into a one-bit pulse-density modulated signal, and the modulated signal is output from flip-flop 667. In the case that the signal input to digital Σ-Δ modulator 668 has a value of 10 bits (=±9 bits), for example, it is desirable that comparison constant value 664 is set to value "0", and the two values output from digital value output unit 662 are set to "511" and "−511" or larger values.

Since Σ-Δ modulator 668 executes over-sampling to perform noise shaping of quantized noise to a high-frequency range, the signal output from AD converter 661 contains high frequency noise components. However, since sensor element 630 cannot respond to such a high frequency, vibration body 631 of sensor element 630 vibrates at an over-sampled predetermined frequency component rather than a sampling frequency of the pulse-density modulated signal. If sensor element 630 has a high response gain in the high frequency, noise of such high frequency may become a problem. Analog filter 669 has a function of reducing the frequency component of the output signal from digital Σ-Δ modulator 668 that raises the problem, thereby providing drive circuit 641 with low noise and high accuracy.

While sensor element 630 having a mass m vibrates flexibly at velocity V in a driving direction D631 shown in FIG. 17A and rotates at angular velocity ω about the center axis in the longitudinal direction of vibration body 631, sensor element 630 receives Coriolis force F as follows.

$$F = 2 \times m \times V \times \omega$$

Figure 20:
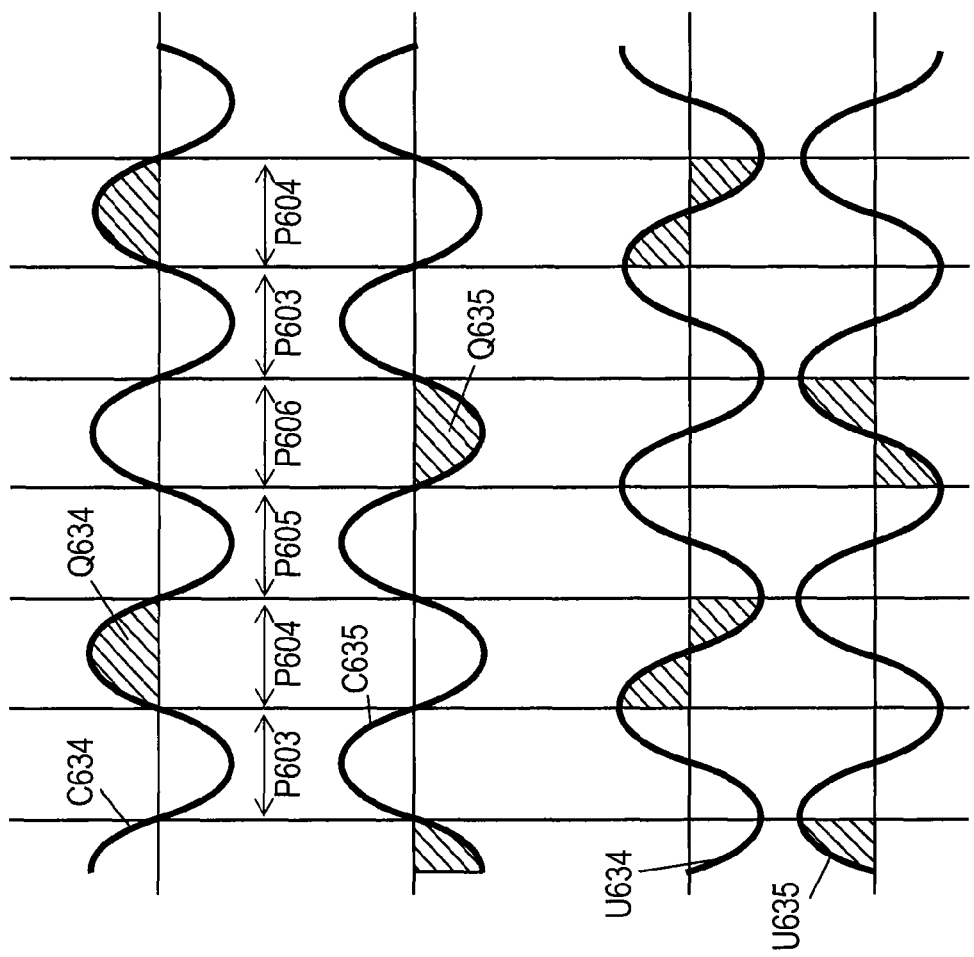
FIG. 20 shows signals of the angular velocity sensor according to Embodiment 3.

FIG. 20 shows sensor signal C634 and undesired signal U634 output from sensor electrode 634 of sensor element 630, and sensor signal C635 and undesired signal U635 output from sensor electrode 635. The Coriolis force F induces electric charges in sensor electrodes 634 and 635 to generate sensor signals C634 and C635. Sensor signals C634 and C635 are generated by Coriolis force F, and hence, have phases advancing by 90 degrees from the signal generated in monitor electrode 633. As shown in FIG. 20, sensor signals C634 and C635 are sinusoidal waves having phases inverse to each other, thus being a positive signal and a negative signal, respectively.

An operation of AD converter 682 in the above case will be described below. Timing signals φ603, φ604, φ605 and φ606 define periods P603, P604, P605 and P606 that repeat continuously in this order. AD converter 682 Σ-Δ modules sensor signal C634 output from sensor electrode 634 and converts sensor signal C634 into a one-bit digital signal during the periods P603 and P604. AD converter 682 also Σ-Δ modulates the negative signal output from sensor electrode 635 and converts the negative signal into a one-bit digital signal during the periods P605 and P606.

An operation of AD converter 682 during the periods P603, P604, P605, and P606 will be detailed below.

First, during the period P603, SW 700 connected with capacitor 698 of integration unit 702 is turned on, and an integrated value held in capacitor 698 is input to comparator 704 of comparator unit 703, which outputs a comparison result as a one-bit digital signal. In addition, SW 692 and SW 693 of DA conversion unit 694 are turned on to discharge an electric charge held in capacitor 691.

Then, during the period P604, a one-bit digital signal output from comparator 704 of comparator unit 703 is latched by D-type flip-flop 705 at the beginning of the period P604, and the latched signal is input to DA switching unit 687 of DA conversion unit 694. DA switching unit 687 switches and selects one of reference voltages V688 and V689 according to the signal input thereto, and inputs the selected reference voltage to capacitor 691. Hence an electric charge corresponding to the input reference voltage is output. SW 685 of input switching unit 684 is turned on to output the electric charge generated from sensor electrode 634. SW 695 of integration unit 702 is turned on to input the electric charges output from input switching unit 684 and DA conversion unit 694 to integration circuit 696. As a result, a total sum of an amount of electric charge Q634 shown in FIG. 20 and the electric charge output from DA conversion unit 694 is integrated and stored in capacitor 698 of integration circuit 696 during the period P604.

As described, AD converter 682 Σ-Δ modulates the electric charge of an amount equivalent to one-half of the amplitude value output from sensor electrode 634 of sensor element 630 by the above operation during the periods P603 and P604.

Similarly, AD converter 682 Σ-Δ modulates the electric charge of an amount equivalent to one-half of the amplitude value output from sensor electrode 635 of sensor element 630 during the periods P605 and P606 subsequent to the periods P603 and P604.

The electric charges of the amounts equivalent to one-halves of the amplitude values of the electric charges output from sensor electrodes 634 and 635 are Σ-Δ modulated by single AD converter 682. The Σ-Δ modulated electric charges are then output as a pair of one-bit digital signals from D-type flip-flops 707 and 708.

The electric charges output from sensor electrodes 634 and 635 of sensor element 630 contain not only the sensor signals generated by the Coriolis force attributed to the angular velocity and having the phase advancing by 90 degrees from the monitor signal generated in monitor electrode 633 but also undesired signals having a phase identical to the phase of the monitor signal. Integration circuit 696 integrates the electric charges of the amount equivalent to one-half of the amplitude value of sensor signals C634 and C635 generated by the Coriolis force F attributed to the angular velocity during the period P604 and P606. Undesired signals U634 and U635 generated in sensor electrodes 634 and 635 have phase identical to the monitor signal, but the phases shift by 90 degrees with respect to sensor signals C634 and C635. When integration circuit 696 integrates undesired signals U634 and U635 during the periods P604 and P606, the resulting value becomes "0" since an amount of the electric charge is integrated in the duration from maximum values to minimum values in the amplitudes of undesired signals U634 and U635 with reference to their center values, which cancel the charges. In other words, during the periods P604 and P606, integration unit 702 integrates the amount of electric charge corresponding to the amplitudes of sensor signals C634 and C635 while canceling undesired signals U634 and U635. That is, the so-called synchronous detection process is performed on sensor signals C634 and C635. Thus, AD converter 682 Σ-Δ modulates and converts the synchronous detected signal into a one-bit digital signal, and outputs the one-bit digital signal.

The above operation Σ-Δ modulates sensor signals C634 and C635 of sensor element 630 and synchronously detects sensor signals C634 and C635. Therefore, angular velocity sensor 1005 does not require conventional analog circuits, such as an I-V converter circuit, a phase shifter, or a synchronous detection circuit, to obtain a digital value of the synchronously-detected signal. Angular velocity sensor 1005 has small-sized circuits inexpensively, thus having a smaller size than sensors having analog circuits.

An operation of processing unit 683 will be described below. First, the one-bit digital signal output from comparator 704 of AD converter 682 is latched by D-type flip-flop 707 of latch circuit 706 at the beginning of the period P604. The one-bit digital signal output from comparator 704 is also latched in D-type flip-flop 708 of latch circuit 706 at the beginning of the period P606.

The amounts of electric charges equivalent to respective one-halves of the amplitude values of the signals output from the pair of sensor electrodes 634 and 635 of sensor element 630 are converted into digital values respectively by the Σ-Δ modulation. The pair of one-bit digital signals latched by D-type flip-flops 707 and 708 are these digital values. Next, the pair of one-bit digital signals output from latch circuit 706 is input to one-bit differential processing unit 709. Differential processing unit 709 calculates a difference between the one-bit digital signals and output the difference as a one-bit differential signal. The one-bit differential signal in the period P603 is the difference between the one-bit digital signals latched during the period P603 preceding periods P604 and P606. This one-bit differential signal represents an amplitude value of the signals shown in FIG. 20 that are output from the pair of sensor electrodes 634 and 635. According to the above operation, the pair of input signals that are positive and negative signals output from the pair of sensor electrodes 634 and 635 of sensor element 630 can be integrated by single integration unit 702. An individual characteristic of individual integration circuit influences a relative error in integration results of input signals. Angular velocity sensor 1005 can reduce the influence on the relative error in the integration results of the pair of input signals more than a case that the integration is executed separately with two integration circuits. Similarly, DA conversion unit 694 includes the single DA conversion unit processes the pair of input signals. Similarly in comparator unit 703, the single comparator comparing the pair of integrated values with a single reference voltage can reduce the influence of characteristics of comparators and fluctuations in reference voltages on a relative error in the comparison result. As discussed above, sensor circuit 681 processes the pair of input signals with single integration circuit 696, single DA conversion unit 694, and single comparator unit 703. Thus arrangement reduces of the adverse influence on the relative errors among the number of individual components more than the case that plural integration circuits, plural DA conversion units, and plural of comparators perform the same processes.

In addition, in the case that the signals output from comparator unit 703 are one-bit signals having any of value "1" and value "0", a pair of comparison signals input to differential processing unit 709 for the one-bit differential operation to obtain a difference of the pair of input signals is limited only to one of the four combinations consisting of values "0" and "0", values "0" and "1", values "1" and "0", and values "1" and "1". Therefore, the difference is obviously one of values "0", "−1", "1", and "0". Differential processing unit 709 can thus perform the one-bit digital operation obtaining a result of subtraction of to the input signals with a simple circuit configuration. Thus, after the pair of input signals are converted into one differential signal by the subtracting process in the above manner, the signal is subjected to other signal processes, such as a low-pass process and a decimation process, with filter circuit 711 including a digital filter. For example, the pair of input signals are converted into multi-bit signals by processing them individually with digital filters, and may be subjected to the differential operation by using arithmetic units capable of executing multi-bit addition and subtraction. When compared to this method, angular velocity sensor 1005 includes arithmetic circuits, such as differential processing unit 709 and filter circuit 711 comprising a digital filter. These arithmetic circuits can be configured of a very small size, or small circuitry with low cost, while providing highly accurate signal processing.

Next, the one-bit differential signal output from one-bit differential processing unit 709 is input to correction processor 710 to be corrected with a predetermined correction factor by a substitution process. This correction operation utilizes the fact that the one-bit differential signal is limited to the three values "0", "1" and "−1", as described above. In the case that the predetermined correction factor is "5", for instance, the correction processor substitutes the input one-bit differential signal having a value of "0", "1", or "-1" with a value of "0", "5", or "-5", respectively. This executes the multiplication.

The multi-bit signal output from filter circuit 646 is input to amplitude determination circuit 724 and phase monitor 726 in timing control circuit 671 as a rectangular wave signal obtained by shaping the waveform of the multi-bit signal. Amplitude determination circuit 724 monitors amplitude of the multi-bit signal output from filter circuit 646. When the amplitude is equal to or larger than 50% of target amplitude, timing switching unit 728 selects the signal output from filter circuit 727 and outputs the selected signal to voltage-controlled oscillator 729. At this moment, PLL circuit 721 works as a closed loop which multiplies the monitor signal of the driving frequency of vibration body 631 as an input signal, and outputs a signal having the phase noise reduced by integration in time domain. The signal synchronized with a specific driving frequency of sensor element 630 is thus input to timing generation circuits 722 and 723.

On the other hand, when the amplitude of the multi-bit signal output from filter circuit 646 is smaller than 50% of the target amplitude, timing switching unit 728 switches to select and output a constant voltage value to voltage-controlled oscillator 729. Accordingly, voltage-controlled oscillator 729 outputs an oscillation signal of a fixed frequency corresponding to the constant voltage value, and this signal is input to timing generation circuits 722 and 723.

An operation of PLL circuit 721 will be described below.

When an analog signal of sinusoidal wave is input, AD converter 661 samples the analog signal at the timing of timing signal φ601, and converts the sampled signal into a digital signal corresponding to amplitude of the input analog signal, and inputs the digital signal to phase monitor 726. For instance, the center value of the sinusoidal wave signal is converted into value "0" of this digital signal, and the sinusoidal wave signal is converted into positive and negative digital signals. Phase monitor 726 outputs a digital value input at the timing of timing signal φ602. This digital value is input to phase correction circuit 726B and corrected to a predetermined value, and then, input to DA converter 725. DA converter 725 converts the input digital value into an analog value, and outputs it. This analog signal is input to voltage-controlled oscillator 729 through filter circuit 727 including a loop filter. Voltage-controlled oscillator 729 outputs an oscillation signal having a frequency corresponding to the input analog signal, and the oscillation signal is fed back as a timing signal of AD converter 661. A value that is output from AD converter 661 in the timing of timing signal φ602 itself is a value corresponding to an amount of a phase difference between timing signal φ602 and a center value, i.e., the zero point of a sinusoidal wave signal. That is, the value output from AD converter 661 is the same value as that output from a phase comparator in an ordinary PLL circuit.

Figure 21:
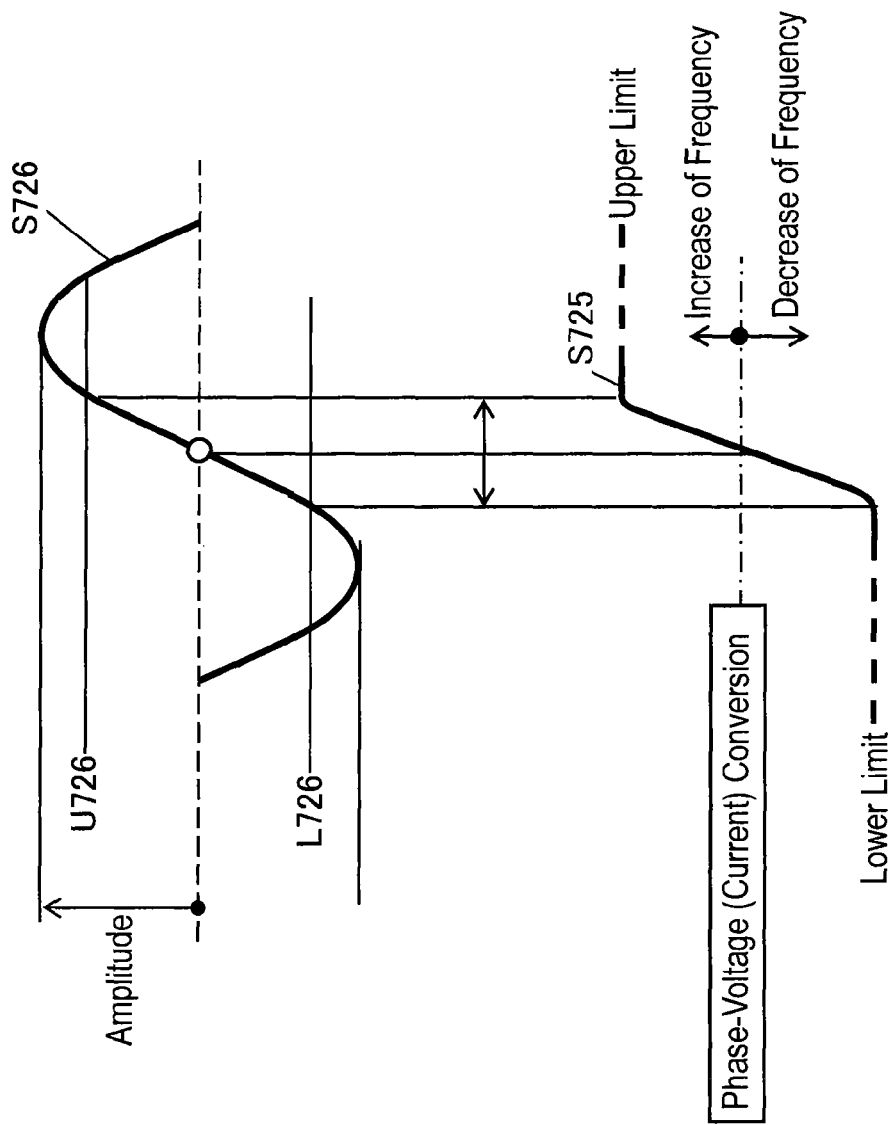
FIG. 21 shows a signal of a PLL circuit of the angular velocity sensor according to Embodiment 3.

FIG. 21 shows analog signal S726 input to phase monitor 726 and analog signal S725 output from DA converter 725. As shown in FIG. 21, DA converter 725 outputs an analog signal that decreases the frequency output from voltage-controlled oscillator 729 when the digital value output from phase monitor 726 has a negative value. On the other hand, DA converter 725 outputs analog signal S725 that increases the frequency output from voltage-controlled oscillator 729 when the digital value output from phase monitor 726 has a positive value. As illustrated, in the loop constituted by the PLL circuit, a loop-controlling causes analog signal S725 output from DA converter 725 to be constant. That is, the digital value becomes "0" in the timing of timing signal φ602. This operation synchronizes the sampling timing of AD converter 661 with timing that crosses the center value of the input analog signal, and thus, synchronizes the timing accurately with the center value, i.e., the zero point of the analog signal.

Phase monitor 726 monitors the input digital value to determine whether the input digital value exceeds a predetermined upper limit U726, or it falls below a predetermined lower limit L726. The output value of phase monitor 726 changes at the timing of timing signal φ602.

Figure 22:
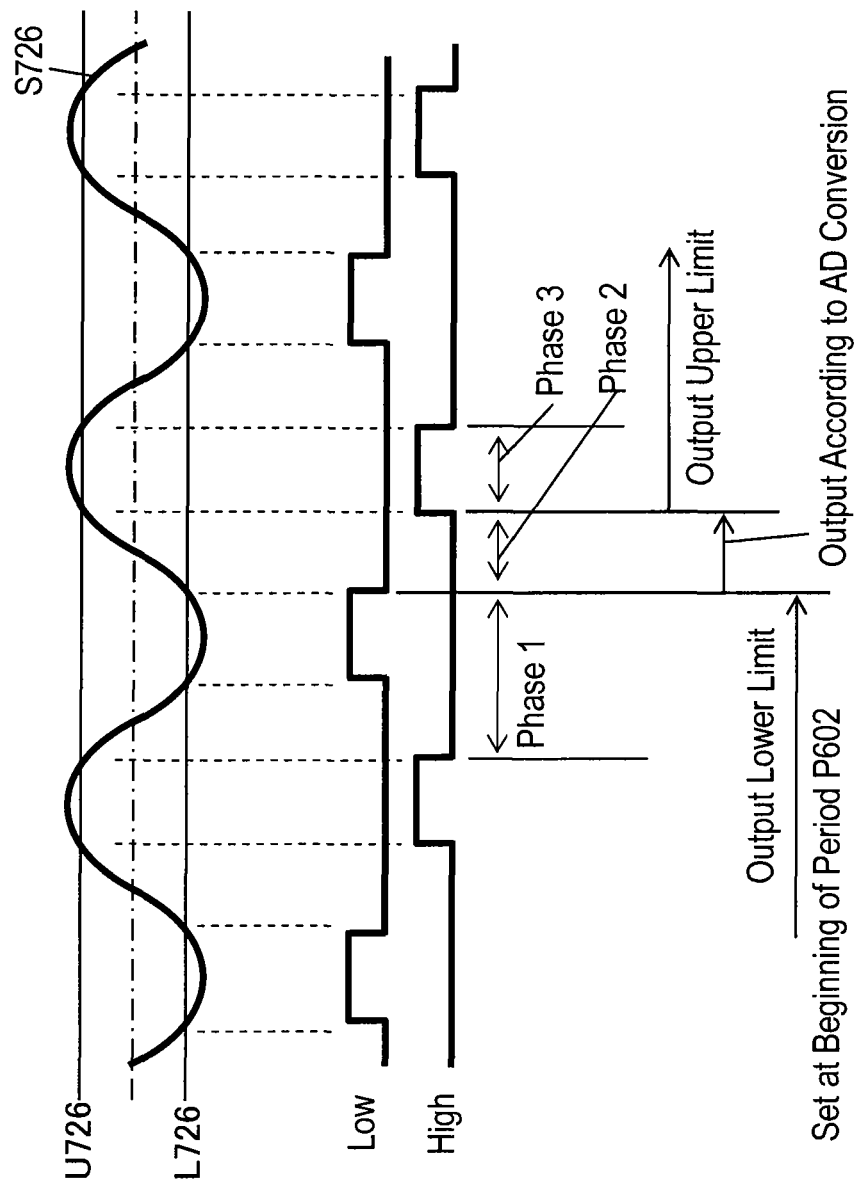
FIG. 22 shows signals of the PLL circuit of the angular velocity sensor according to Embodiment 3.
Figure 23:
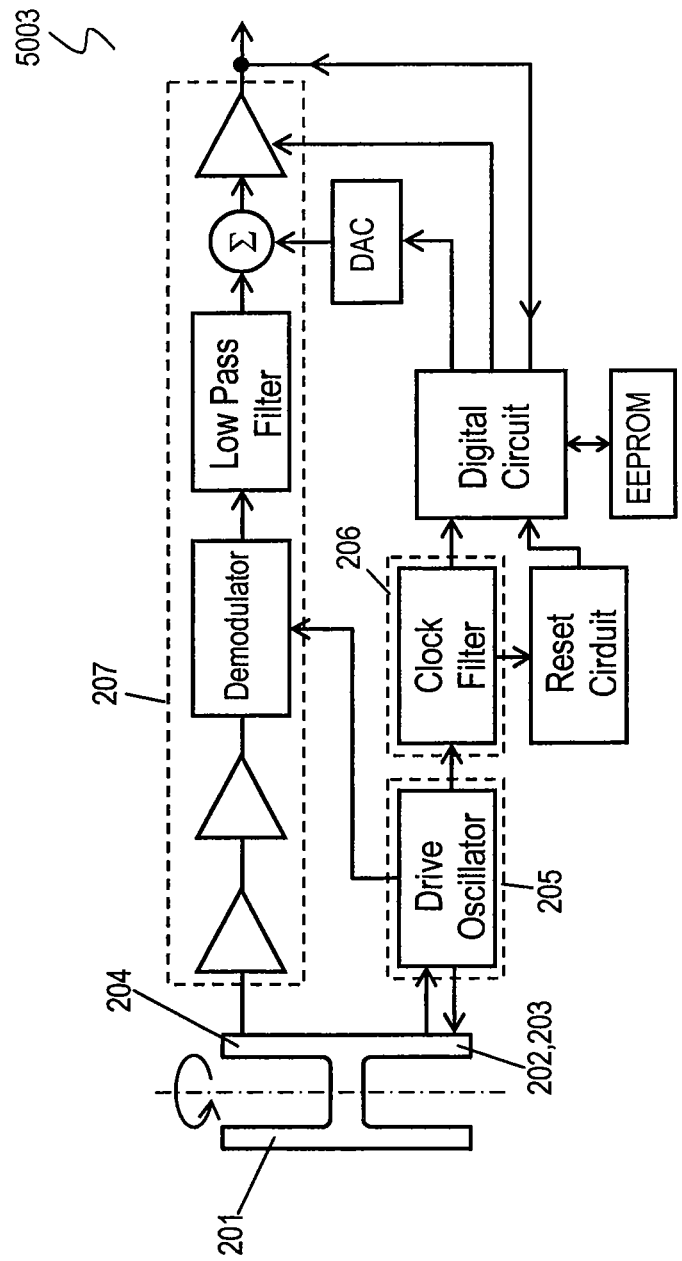
FIG. 23 is a circuit diagram of a conventional angular velocity sensor.
Figure 24:
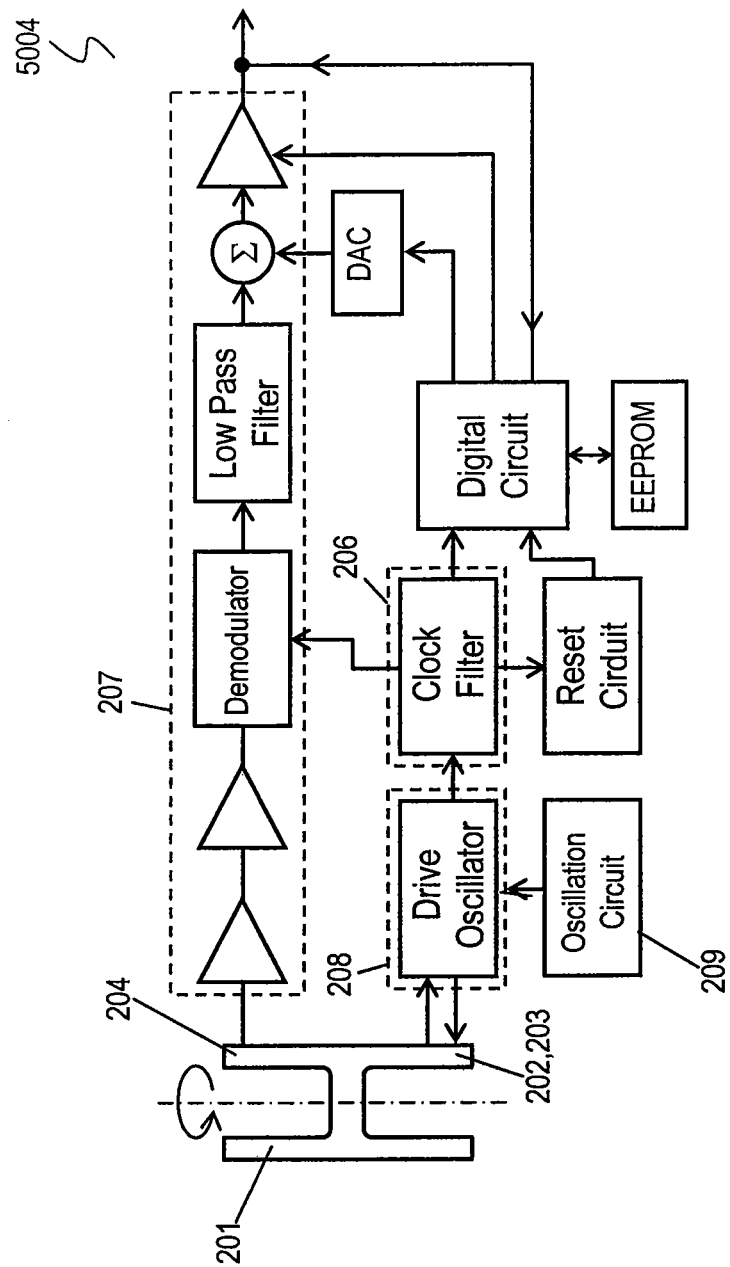
FIG. 24 is a circuit diagram of another conventional angular velocity sensor.
Figure 25:
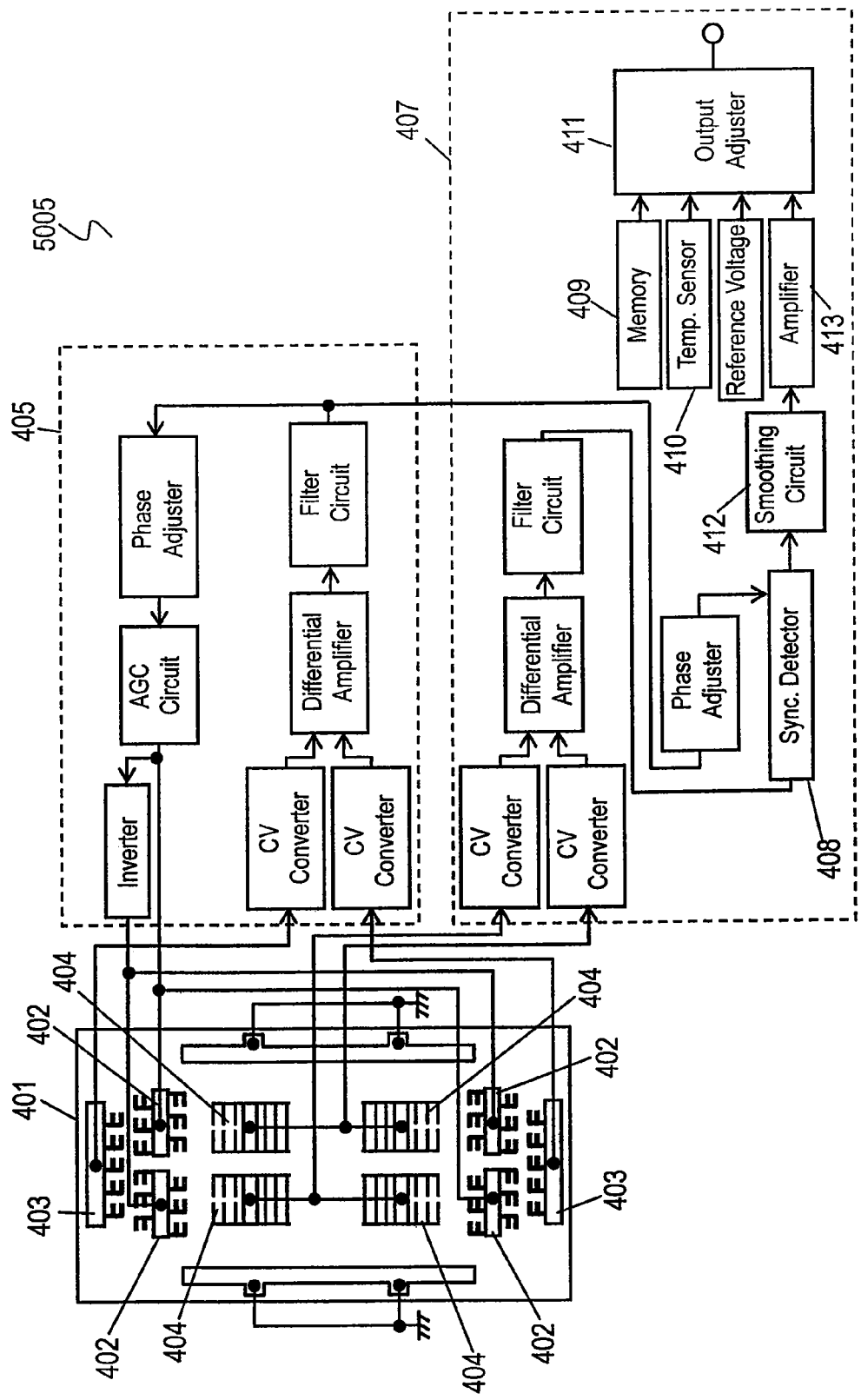
FIG. 25 is a circuit diagram of still another conventional angular velocity sensor.
Figure 26B:
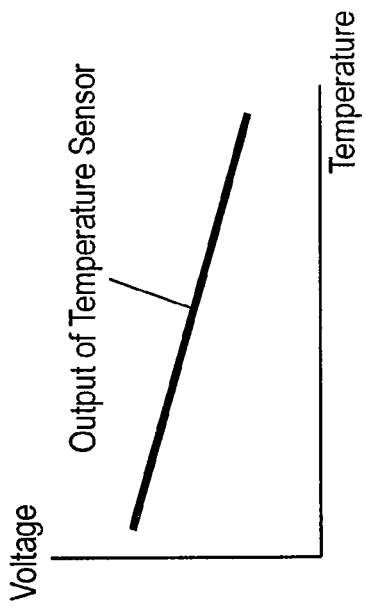
FIG. 26B shows a voltage of the angular velocity sensor shown in FIG. 25.
Figure 26D:
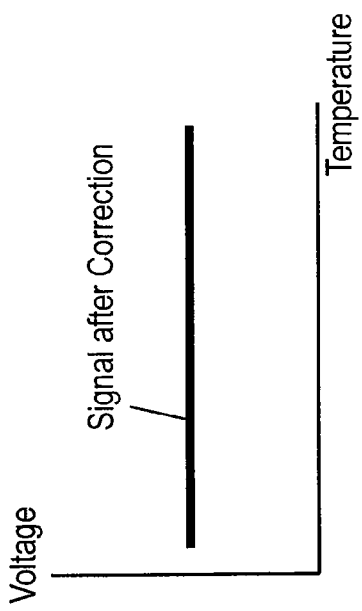
FIG. 26D shows a voltage of the angular velocity sensor shown in FIG. 25.
Figure 26A:
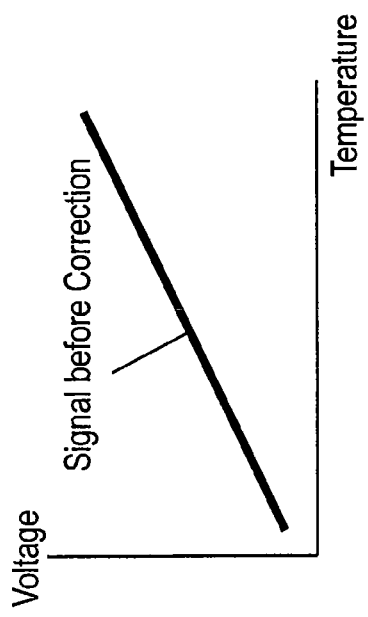
FIG. 26A shows a voltage of the angular velocity sensor shown in FIG. 25.
Figure 26C:
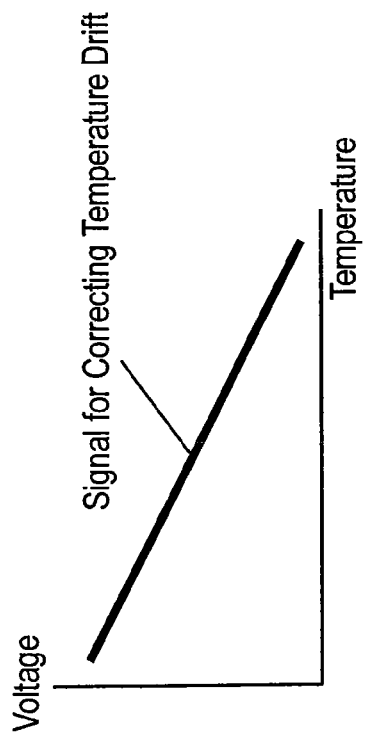
FIG. 26C shows a voltage of the angular velocity sensor shown in FIG. 25.

FIG. 22 illustrates an operation of PLL circuit 721. More specifically, a time period defined as phase 1 starts when the digital value input after timing signal φ602 is supplied, i.e., after the start of period P602, falls below the upper limit U726 and then below the lower limit L726, and ends when the digital value rises above the lower limit L726. A time period defined as phase 2 starts from the end of phase 1 and ends when the input digital value exceeds the upper limit U726 first after the start of phase 2. A time period defined as phase 3 starts from the end of phase 2 and ends when analog signal S726 falls below the upper limit U726 first after the start of phase 3. Phase monitor 726 outputs the lower limit L726 when timing signal φ602 is input in phase 1 as shown in FIG. 22. Phase monitor 726 outputs the input digital value at the timing of timing signal φ602 when timing signal φ602 is input in phase 2. Phase monitor 726 outputs the upper limit U726 when timing signal φ602 is input in phase 3. DA converter 725 then receives the digital value output from phase monitor 726, and outputs an analog signal of the amplitude corresponding to this digital value. This analog signal is input to filter circuit 727 including a loop filter to filter the analog signal, and the filtered analog signal is input to voltage-controlled oscillator 729 through timing switching unit 728. Voltage-controlled oscillator 729 outputs a frequency determined based on the signal obtained by filtering the analog signal corresponding to the digital value output from phase monitor 726. Since phase monitor 726 has the functions of determining the phase and setting the upper limit U726 and the lower limit L726 of the output signal as discussed above, the analog signal input to voltage-controlled oscillator 729 is maintained within a predetermined range. As a result, the frequency of the signal output from voltage-controlled oscillator 729 can be restricted. This prevents malfunctions, such as so-called double frequency lock in which PLL circuit 721 locks at a frequency other than the frequency determined by multiplying the frequency of the input analog signal by a frequency dividing factor of the frequency divider in the overall operation of PLL circuit 721, thereby ensuring PLL circuit 721 to lock at the predetermined frequency.

Phase correction circuit 726B to which the signal output from phase monitor 726 is input changes the input phase comparison value by a predetermined value and outputs the changed value, and hence, can adjust the phase to be locked precisely by a resolution of the digital value. If phase correction circuit 726B adds a positive value to the input value, for instance, voltage-controlled oscillator 729 outputs a frequency that is higher by a value corresponding to the added value than the case without the addition, hence locking the frequency at a point of the phase shifted forward.

Phase correction circuit 726B can adjust phases of timing signals φ603, φ604, φ605, and φ606 produced according to oscillation signal S729 by increments of the clock resolution of oscillation signal S729. The timing signals φ603, φ604, φ605, and φ606 having phases adjusted are supplied to and used by sensor circuit 681.

If the signals delay due to AD conversion or arithmetic operations in AD converter 661 by a certain number of clocks, the phase is locked while shifting by the amount of the delay. The value output from phase monitor 726 is changed to a value corresponding to the timing shifted only by the number of clocks delayed from the timing of timing signal φ602. This operation can synchronizes timing signal φ602 with the timing that crosses the center value of the input analog signal. Hence, timing signal φ602 is synchronized accurately with the center value, i.e., the zero point of the analog signal.

The periods P601 and P602 represent switching timings of input switching unit 642, DA switching unit 649, SW 654, SW 655, SW 656, and D-type flip-flop 660 of drive circuit 641. Timing signals φ601 and φ602 define the periods P601 and P602. Timing generation circuit 722 generates and outputs timing signals φ601 and φ602 based on the signal output from PLL circuit 721. The periods P603, P604, P605, and P606 represent switching timings of input switching unit 684, DA switching unit 687, SW 692, SW 693, SW 695, SW 700, SW 701, and D-type flip-flop 705 of sensor circuit 681. Timing signals φ603, φ604, φ605, and φ606 define the periods P603, P604, P605, and P606. Timing generation circuit 723 generates and outputs timing signals φ603, φ604, φ605, and φ606.

An operation of angular velocity sensor 1005 in the case that phase difference φPH occurs between the timing signals output from timing control circuit 671.

Phase difference φPH corresponds to a digital value output from phase monitor 726, and is detected in real time. In order to determine an influence of undesired signal Q exists, zero-point output X601 of differential processing unit 709 is first obtained when no phase difference φPH in the timing of detection while no angular velocity is applied to the angular velocity sensor. Next, zero-point output X602 of differential processing unit 709 with the detecting phase shifted by an arbitrary fixed phase, and calculate the difference (X602−X601). At this moment, if no undesired signal Q exists, then the difference (X602−X601) is zero, that is, zero-point outputs X601 and X602 are equal to each other.

When undesired signal Q exists, a detection flaw of undesired signal Q having amount SQ causes a phase difference (φPH×SQ) and produces a drift of the output of the sensor by the phase difference, being calculated as the difference (X602−X601).

The amount SQ of undesired signal Q can be calculated since the value of the difference (X602−X601) is proportional to the amount SQ of undesired signal Q when the phase difference φPH is fixed. A jitter noise of phase difference (φPH×SQ) caused by phase difference φPH and undesired signal Q can be hence cancelled by the following method. Assume that a difference of zero-point output (X602−X601) is 1000LSB, for instance, when undesired signal Q has fixed amount SQ, and phase difference φPH is intentionally created to an amount of 10LSB in the output of phase monitor 726. This means that the zero-point output of 100LSB is produced for 1LSB of phase difference φPH. Jitter cancellation value calculation circuit 730 includes a memory, such as ROM, for storing jitter cancellation factors C730. In the above example, jitter cancellation value calculation circuit 730 stores 100 values of jitter cancellation factor C730. Jitter cancellation value calculation circuit 730 calculates correction factor CA corresponding to the jitter noise by multiplying jitter cancellation factor C730 by a value of phase difference φPH detected in real time by the following equation.

$$CA = C730 \times \phi PH = 100 \times \phi PH$$

An accurate signal with the jitter noise corrected can be obtained by inputting calculated correction factor CA to correction processor 710 of sensor circuit 681, and performing the correction by adding correction factor CA to the signal output in real time from differential processing unit 709 of sensor circuit 681.

In other words, while no angular velocity id applied to angular velocity sensor 1005, the jitter cancellation factor is calculated based on a difference between an output value obtained under the condition that the detecting phase is shifted by an arbitrary fixed phase and a sensor output value obtained under another condition that the detecting phase is not shifted. The jitter cancellation value can be calculated easily and accurately in the digital circuit since it is easy to shift the phase of PLL circuit.

In addition, the correction factor calculated with jitter cancellation value calculation circuit 730 is supplied to correction processor 710 provided in the subsequent stage of differential processing unit 709 of sensor circuit 681. It is therefore possible to calculate the jitter cancellation value in real time according to phase difference φPH, and correct a drift of the signal output from angular velocity sensor 1005.

As described above, angular velocity sensor 1005 does not cause any change in the output signal even if the detection phase shifts due to the jitter in the timing signal, thus having stable output characteristics.

INDUSTRIAL APPLICABILITY

An angular velocity sensor according to the present invention has a stable output characteristic, and applicable especially to, e.g., attitude control and a navigation system of a movable body, such as an aircraft and a motor vehicle.

REFERENCE MARKS IN THE DRAWINGS

230 Sensor Element
232 Driving Electrode
233 Monitor Electrode
234 Sensor Electrode
241 Drive Circuit
246 Filter Circuit
247 AGC Circuit
248 Driver
261 AD Converter
281 Sensor Circuit
321 PLL Circuit
324 Amplitude Determination Circuit
326 Phase Monitor
328 Timing Switching Unit
329 Voltage-Controlled Oscillator
334 Constant Voltage source
430 Sensor Element
432 Driving Electrode
433 Monitor Electrode
434 Sensor Electrode
441 Drive Circuit
481 Sensor Circuit
531 Temperature Sensor
533 Digital Low-Pass Filter
534 Memory
536 Temperature Correction Circuit
630 Sensor Element 632 Driving Electrode
633 Monitor Electrode
634 Sensor Electrode
641 Drive Circuit
647 AGC Circuit
681 Sensor Circuit
710 Correction Processor
721 PLL Circuit
726 Phase Monitor
729 Voltage-Controlled Oscillator
730 Jitter Cancellation Value Calculation Circuit

The invention claimed is:

1. An angular velocity sensor comprising:
a vibration body;
a sensor electrode provided on the vibration body for generating a signal corresponding to an angular velocity applied to the vibration body;
a driving electrode provided on the vibration body, the driving electrode having a driving signal for vibrating the vibration body input thereto;
a monitor electrode provided on the vibration body for generating a signal according to vibration of the vibration body;
a PLL circuit including
  a constant voltage source for generating a constant voltage,
  a timing switching unit for outputting a voltage by switching selectively between the constant voltage and a voltage corresponding to the monitor signal, and
  a voltage-controlled oscillator for outputting an oscillation signal having a frequency corresponding to the voltage output from the timing switching unit;
a drive circuit for supplying the driving signal to the driving electrode based on the oscillation signal output from the voltage-controlled oscillator as to vibrate the vibration body at a predetermined amplitude;
a sensor circuit for outputting a signal representing the angular velocity based on the signal output from the sensor electrode; and
an amplitude determination circuit for measuring amplitude of vibration of the vibration body based on a signal output from the drive circuit,
wherein:
a) when the amplitude measured by the amplitude determination circuit is smaller than a predetermined value, the timing switching unit outputs the constant voltage output from the constant voltage source to the voltage-controlled oscillator, and outputs a start-up mode signal to a device outside of the angular velocity sensor, the start-up mode signal indicating to the device that the angular velocity sensor is unable to detect the angular velocity normally under a state of start-up, and
b) when the amplitude measured by the amplitude determination circuit is greater than the predetermined value, the timing switching unit outputs a phase adjustment mode signal to the device outside of the angular velocity sensor, the phase adjustment mode signal indicating to the device that the angular velocity sensor is unable to detect the angular velocity normally under a state of phase adjustment.

2. The angular velocity sensor of claim 1,
wherein the PLL circuit further includes a phase monitor for detecting an amount of a phase difference between a phase of signal based on the oscillation signal and a phase of signal based on the signal output from the monitor electrode, and
wherein the timing switching unit outputs a phase adjustment mode signal when the amount of phase difference is outside a predetermined threshold range.

3. The angular velocity sensor of claim 1,
wherein the signal output from the sensor circuit is a digital signal composed of one or more bits, and
wherein the start-up mode signal is a redundant signal composed of at least one bit, and
wherein the angular velocity sensor is configured to output a multi-bit digital signal composed of a plurality of bits including the one or more bits of the digital signal and the at least one bit of the redundant signal.

\* \* \* \* \*